(12) United States Patent
Nishigata et al.

(10) Patent No.: US 8,179,754 B2
(45) Date of Patent: May 15, 2012

(54) OPTICAL DISC APPARATUS, METHOD, AND INFORMATION STORAGE MEDIUM FOR READING INFORMATION RECORDED ON AN OPTICAL DISC MEDIUM

(75) Inventors: Naoyuki Nishigata, Tokyo (JP);
Tetsuhisa Koseki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 323 days.

(21) Appl. No.: 12/468,986

(22) Filed: May 20, 2009

(65) Prior Publication Data
US 2009/0290455 A1    Nov. 26, 2009

(30) Foreign Application Priority Data

May 26, 2008  (JP) .................................. 2008-136783
May 26, 2008  (JP) .................................. 2008-136784

(51) Int. Cl.
*G11B 7/00*    (2006.01)

(52) U.S. Cl. .................................. 369/44.35; 369/53.28

(58) Field of Classification Search ........................ None
See application file for complete search history.

(56) References Cited

U.S. PATENT DOCUMENTS

| | | |
|---|---|---|
| 2007/0064552 A1 | 3/2007 | Kurokawa et al. |
| 2008/0074973 A1 | 3/2008 | Nishino |
| 2008/0291803 A1* | 11/2008 | Ikeda .................... 369/53.25 |
| 2008/0310263 A1 | 12/2008 | Sagara |

FOREIGN PATENT DOCUMENTS

| | | |
|---|---|---|
| EP | 1 318 507 | 6/2003 |
| EP | 1 953 743 | 8/2008 |
| JP | 5-159326 | 6/1993 |
| JP | 11-16172 | 1/1999 |
| JP | 2003-99927 | 4/2003 |
| JP | 2007-4836 | 1/2007 |
| JP | 2007-4854 | 1/2007 |
| JP | 4001024 | 10/2007 |
| JP | 2008-47202 | 2/2008 |
| WO | 2007/060975 | 5/2007 |

OTHER PUBLICATIONS

European Search Report dated Aug. 6, 2009, from the corresponding European Application.
Notice of Rejection dated Jun. 1, 2010, from the corresponding Japanese Application.
European Search Report dated Apr. 11, 2011, from corresponding European Application No. 11 15 0763.

* cited by examiner

*Primary Examiner* — Paul Huber
(74) *Attorney, Agent, or Firm* — Katten Muchin Rosenman LLP

(57) ABSTRACT

An optical disc apparatus controls a relative position of an optical pickup with respect to a surface of an optical disc medium according to an output signal output from the optical pickup according to information recorded on the optical disc medium to implement servo control for maintaining a state where the information is readable, acquires an evaluation value for information reading accuracy when the servo control is implemented, and calculates a set value of a parameter to be set for the implementation of the servo control based on evaluation values respectively acquired for at least three set values of the parameter while changing the set value of the parameter for the servo control. The optical disc apparatus determines the set value to be set for further acquiring the evaluation value according to the evaluation values acquired for at least two set values of the parameter.

15 Claims, 16 Drawing Sheets

FROM DRIVE CIRCUIT 16

TO RF AMPLIFIER

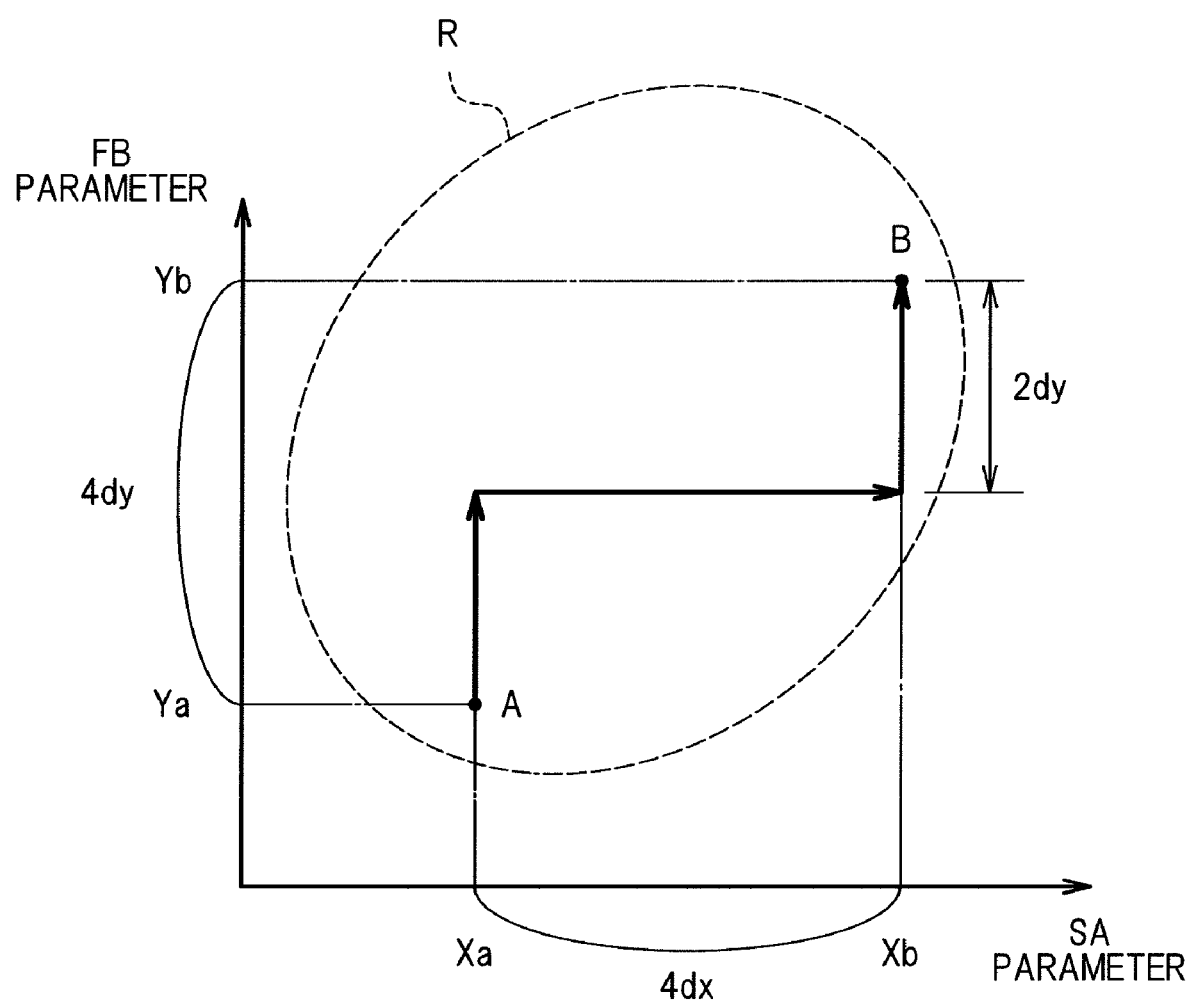

OPTICAL DISC APPARATUS, METHOD, AND INFORMATION STORAGE MEDIUM FOR READING INFORMATION RECORDED ON AN OPTICAL DISC MEDIUM

BACKGROUND OF THE INVENTION

1. Field of the Invention

The present invention relates to an optical disc apparatus for reading information recorded on an optical disc medium such as a CD, a DVD, and a Blu-ray disc (trademark), a method of controlling the optical disc apparatus, and an information storage medium.

2. Description of the Related Art

In recent years, various optical disc media have been used as information recording media. An optical disc apparatus is used to read information recorded on such an optical disc medium. The optical disc apparatus includes an optical pickup which irradiates the optical disc medium with light to detect reflected light from the optical disc medium. The optical disc apparatus controls a drive system for relatively moving the optical pickup with respect to a surface of the optical disc medium to move the optical pickup to a position at which the information can be read. In this manner, the optical disc apparatus reads the information from the optical disc medium.

The optical disc medium may move slightly vertically due to axial runout caused by the rotation of the optical disc medium when the information is read. Moreover, a distance from the center of the optical disc medium to a track of the optical disc medium on which the information is recorded gradually changes while the information is being continuously read. Therefore, servo control is performed when the information is read. In the servo control, feedback is performed on the drive system according to an output signal output from the optical pickup to maintain a state where the information recorded on the optical disc medium is readable. As a specific example, the optical disc apparatus performs focus servo control for adjusting the distance between the optical pickup and the surface of the optical disc medium to maintain a state where the light radiated from the optical pickup is focused on a signal surface of the optical disc medium or tracking servo control for moving the optical pickup in a diameter direction of the optical disc medium, to allow a focus of the light to follow a tracking position.

When the optical disc apparatus implements the servo control, various control parameters are set for the control. For example, in the focus servo control, a parameter (focus bias parameter) regarding an offset value for a distance between an objective lens included in the optical pickup and the surface of the optical disc medium and a parameter for the correction of spherical aberration of the objective lens can be given as the parameters described above. By appropriately adjusting the control parameters, information reading accuracy of the optical pickup can be improved.

Set values to be set for the control parameters vary depending on various factors such as the type of the optical disc medium to be read, individual variability of the optical disc medium, and an environment of use of the optical pickup. Therefore, the optical disc apparatus is required to perform a parameter adjustment operation in advance before starting to read the information from the optical disc medium. Specifically, the parameter adjustment operation is control for changing the set value of the control parameter within a setting allowable range, attempting to read the information from the medium with several set values being set, evaluating the information reading accuracy at this time to calculate the set value (adjusted value) which can improve the information reading accuracy, and setting the calculated set value as the control parameter (for example, see Japanese Patent No. 4001024).

In the parameter adjustment operation as described above, an evaluation value such as, for example, a jitter value is used for evaluating the reading accuracy. The jitter value in this case indicates a time deviation of a reproduced signal obtained from an output of the optical pickup with respect to a reference clock. Such an evaluation value and the set value of the control parameter generally have a relationship which can be approximated by a quadratic curve. FIG. 19 is a graph showing an example of the relation between the set value of the control parameter and the evaluation value as described above. In FIG. 19, the set value of the control parameter is represented on an abscissa axis (X-axis), whereas the evaluation value is represented on an ordinate axis (Y-axis). The jitter value is used as the evaluation value in this case. Therefore, the reading accuracy becomes higher as the evaluation value decreases. In the example illustrated in FIG. 19, the relation between the set value of the control parameter and the evaluation value is represented by a concave upward parabola. The evaluation value can be reduced (that is, the information reading accuracy can be improved) by a value on the X-axis, which corresponds to the position in the vicinity of a vertex of the parabola, being set as the set value of the control parameter.

When the optical disc apparatus performs the parameter adjustment operation by taking advantage of the relation between the set value of the control parameter and the evaluation value as described above, it is necessary to obtain the quadratic curve which approximates the relation between the set value of the control parameter and the evaluation value in the following manner. Specifically, while the control parameter is respectively set to at least three set values which are different from each other, the evaluation values respectively corresponding to the set values are acquired. The reason why at least three sample data items are required is as follows. Unless at least three points as illustrated in FIG. 19, that is, a point Pa at which a slope of a tangent becomes negative, a point Pb at which the slope of the tangent becomes close to 0, and a point Pc at which the slope of the tangent becomes positive, are specified on the quadratic curve, the above-mentioned relation cannot be approximated with good accuracy.

For performing the parameter adjustment operation, the optical disc apparatus, for example, first sets a predetermined initial value as the control parameter, and then, attempts to acquire the evaluation values respectively corresponding to the set values while the set value is being increased (or decreased) by a predetermined step amount for each time. The setting allowable range of the value of the control parameter is set large to a certain extent in consideration of a variation in optimal set value corresponding to a target of adjustment depending on the type or the individual variability of the optical disc medium. For some types of optical disc media, the information can be read and the evaluation value can be acquired only within a limited range in the vicinity of the optimal set value, which is contained in the setting allowable range of the control parameter. In such a case, with the method of acquiring the evaluation value while sequentially increasing or decreasing the set value from the fixed initial value within the setting allowable range of the control parameter, the evaluation value is successfully obtained only after a number of attempts to acquire the evaluation value. As a result, the acquisition of the plurality of sample data items necessary for calculating the optimal set value sometimes takes a long time.

When the optimal adjusted values are to be set by the parameter adjustment operation as described above for the plurality of control parameters, it is sometimes desirable to collectively change the plurality of control parameters to simultaneously adjust the control parameters. The reason for this is as follows. In general, the information reading accuracy is represented by a function of the plurality of control parameters. Therefore, even when the individual control parameters are independently adjusted, the optimal adjusted values are not always obtained.

Fluctuations in the control parameters described above affect the servo control. For some combinations of the values of the plurality of control parameter, the servo control can no longer be continued (specifically, a servo error occurs) in some cases. As a specific example, FIG. 20 shows the range of the combination of the control parameters, in which the focus servo control can be performed normally (servo normal operation range R), for two control parameters, i.e., a parameter for the focus bias (FB parameter) and a parameter for the correction of spherical aberration (SA parameter). On this graph, an abscissa axis represents a value of the SA parameter, whereas an ordinate axis represents a value of the FB parameter. An area surrounded by a broken line represents the servo normal operation range R. Specifically, the servo control can be continued as long as the combination of the value of the SA parameter and the value of the FB parameter is within the servo normal operation range R.

When the parameter adjustment is performed by varying the values of the control parameters to evaluate the reading accuracy after the values of the control parameters are changed, the servo error occurs if the combination of the changed values of the control parameters is out of the servo normal operation range R described above. In this case, unless servo setting processing for starting the servo control (for example, in the case of the focus servo control, focus detection processing for adjusting a focus of an objective lens on a signal surface of the optical disc medium) is performed again, the information cannot be read. Therefore, when the reading accuracy is evaluated while changing the combination of the values of the control parameters, the combination of the values of the control parameters after being changed is required to fall within the servo normal operation range R.

However, even if the combination of the values of the control parameters after being changed falls within the servo normal operation range R, there is a fear that a servo error will occur in a process of varying the combination of the values of the control parameters when the amount of change for each of the control parameters, which are changed at one time, is large. A specific example of the occurrence of such a problem is indicated by an arrow in FIG. 20. The arrow indicates the process of changing the value of each of the control parameters from the combination of the values of the control parameters indicated by a point A to the combination of the values of the control parameters indicated by a point B. In the example illustrated in FIG. 20, the optical disc apparatus first changes the SA parameter from a state indicated by the point A to allow the state to transit to that indicated by a point X. Thereafter, the optical disc apparatus changes the FB parameter to allow the state to transit to that indicated by the point B. In this case, though both the points A and B fall within the servo normal operation range R to provide the combination of the values of the control parameters, which allows the focus servo control, the combination of the values of the control parameters moves out of the servo normal operation range R when the state of the combination transits to that indicated by the point X. Therefore, the servo error occurs to prevent the servo control from being continued. Therefore, for evaluating the reading accuracy in the state indicated by the point B, it is necessary to perform the servo setting processing again. As a result, the parameter adjustment requires extra time. As described above, when one of the plurality of control parameters is greatly changed in one time for adjusting the control parameters while changing the combination of the values of the plurality of control parameters, the servo error occurs though the combination of the values of the control parameters after being changed satisfies a servo control allowable condition. As a result, there is a danger of causing a time loss.

SUMMARY OF THE INVENTION

The present invention has been made in view of the above-mentioned actual condition, and has an object of providing an optical disc apparatus capable of acquiring a plurality of sample data items necessary for calculating an optimal set value of a parameter within a short period of time when the parameter for servo control is adjusted, a method of controlling the optical disc apparatus, and an information storage medium.

The present invention has another object of providing an optical disc apparatus capable of preventing a servo error from easily occurring when the parameters for the servo control are adjusted, a method of controlling the optical disc apparatus, and an information storage medium.

According to one aspect of the present invention, an optical disc apparatus for reading information recorded on an optical disc medium, includes: an optical pickup for outputting an output signal according to the information recorded on the optical disc medium; a servo implementation unit for controlling a relative position of the optical pickup with respect to a surface of the optical disc medium according to the output signal of the optical pickup to implement servo control for maintaining a state where the information is readable from the optical disc medium; evaluation value acquisition means for acquiring an evaluation value for information reading accuracy of the optical pickup when the servo control is implemented; and parameter adjustment means for calculating a set value of a predetermined parameter to be set for the implementation of the servo control based on the evaluation value acquired by the evaluation value acquisition means for each of at least three set values of the predetermined parameter while changing the set value of the predetermined parameter, in which the parameter adjustment means determines the set value to be set for further acquiring the evaluation value according to the evaluation values acquired for at least two set values of the predetermined parameter.

In the above-mentioned optical disc apparatus, the parameter adjustment means may determine to make the set value set for further acquiring the evaluation value one of larger than a maximum value and smaller than a minimum value of the at least two set values of the predetermined parameter according to a magnitude relation between two evaluation values acquired respectively for the maximum value and the minimum value.

In the above-mentioned optical disc apparatus, the optical pickup may include an objective lens for focusing light on a signal surface of the optical disc medium and a collimator lens for changing its own position to correct spherical aberration of the objective lens, and the predetermined parameter may be a parameter for the position of the collimator lens.

In the above-mentioned optical disc apparatus, the optical pickup may include an objective lens for focusing light on a signal surface of the optical disc medium, and the predetermined parameter may be a parameter regarding an offset value for a distance between the objective lens and the surface of the optical disc medium.

Further, according to another aspect of the present invention, a method of controlling an optical disc apparatus including: an optical pickup for outputting an output signal according to information recorded on an optical disc medium; and a servo implementation unit for controlling a relative position of the optical pickup with respect to a surface of the optical disc medium according to the output signal of the optical pickup to implement servo control for maintaining a state where the information is readable from the optical disc medium, includes: an evaluation value acquisition step of acquiring an evaluation value for information reading accuracy of the optical pickup when the servo control is implemented; and a parameter adjustment step of calculating a set value of a predetermined parameter to be set for the implementation of the servo control based on the evaluation value acquired in the evaluation value acquisition step for each of at least three set values of the predetermined parameter while changing the set value of the predetermined parameter, in which the parameter adjustment step includes determining the set value to be set for further acquiring the evaluation value according to the evaluation values acquired for at least two set values of the predetermined parameter.

Further, according to still another aspect of the present invention, a computer readable information storage medium stores a program for controlling an optical disc apparatus, the optical disk apparatus including: an optical pickup for outputting an output signal according to information recorded on an optical disc medium; and a servo implementation unit for controlling a relative position of the optical pickup with respect to a surface of the optical disc medium according to the output signal of the optical pickup to implement servo control for maintaining a state where the information is readable from the optical disc medium, the program controlling a computer to function as: evaluation value acquisition means for acquiring an evaluation value for information reading accuracy of the optical pickup when the servo control is implemented; and parameter adjustment means for calculating a set value of a predetermined parameter to be set for the implementation of the servo control based on the evaluation value acquired by the evaluation value acquisition means for each of at least three set values of the predetermined parameter while changing the set value of the predetermined parameter, in which the parameter adjustment means determines the set value to be set for further acquiring the evaluation value according to the evaluation values acquired for at least two set values of the predetermined parameter.

Further, according to still another aspect of the present invention, an optical disc apparatus for reading information recorded on an optical disc medium, includes: an optical pickup for outputting an output signal according to the information recorded on the optical disc medium; a servo implementation unit for controlling a relative position of the optical pickup with respect to a surface of the optical disc medium according to the output signal of the optical pickup to implement servo control for maintaining a state where the information is readable from the optical disc medium; and parameter adjustment means for changing a value of each of a plurality of parameters set for the servo control to a given target value when the servo control is implemented, in which the parameter adjustment means performs the change of the value of at least one of the plurality of parameters to the target value a plurality of times, and changes another parameter between the plurality of times of changing the at least one parameter.

In the above-mentioned optical disc apparatus, the parameter adjustment means may perform the change of the value of the at least one of the plurality of parameters a plurality of times when an amount of the change of the at least one of the plurality of parameters to the target value exceeds a predetermined reference amount.

In the above-mentioned optical disc apparatus, the parameter adjustment means may divide an amount of the change of the at least one of the plurality of parameters to the target value in predetermined step change amounts as units, and change the value of the at least one of the plurality of parameters by each of the predetermined step change amounts each time.

In the above-mentioned optical disc apparatus, when an error occurs in the servo control in a process of changing the value of each of the plurality of parameters to the target value, the parameter adjustment means may change the value of each of the plurality of parameters after the predetermined step change amounts are reduced, for changing each of the values of the plurality of parameters the next time.

Further, according to still another aspect of the present invention, a method of controlling an optical disc apparatus, including an optical pickup for outputting an output signal according to information recorded on an optical disc medium; and a servo implementation unit for controlling a relative position of the optical pickup with respect to a surface of the optical disc medium according to the output signal of the optical pickup to implement servo control for maintaining a state where the information is readable from the optical disc medium, includes changing a value of each of a plurality of parameters set for the servo control to a given target value during the implementation of the servo control, in which the changing includes performing the change of the value of at least one of the plurality of parameters to the target value a plurality of times, and changing another parameter between the plurality of times of changing the at least one parameter.

Further, according to still another aspect of the present invention, a computer readable information storage medium stores a program for controlling an optical disc apparatus, including an optical pickup for outputting an output signal according to information recorded on an optical disc medium, and a servo implementation unit for controlling a relative position of the optical pickup with respect to a surface of the optical disc medium according to the output signal of the optical pickup to implement servo control for maintaining a state where the information is readable from the optical disc medium, the program controlling a computer to function as parameter adjustment means for changing a value of each of a plurality of parameters set for the servo control to a given target value during the implementation of the servo control, in which the parameter adjustment means performs the change of the value of at least one of the plurality of parameters to the target value a plurality of times, and changes another parameter between the plurality of times of changing the at least one parameter.

BRIEF DESCRIPTION OF THE DRAWINGS

In the accompanying drawings:

FIG. 16 is an explanatory graph showing still another example of the process of changing the combination of the values of the control parameters;

DETAILED DESCRIPTION OF THE INVENTION

Hereinafter, an exemplary embodiment of the present invention is described in detail referring to the accompanying drawings.

[Hardware Configuration]

Figure 1:
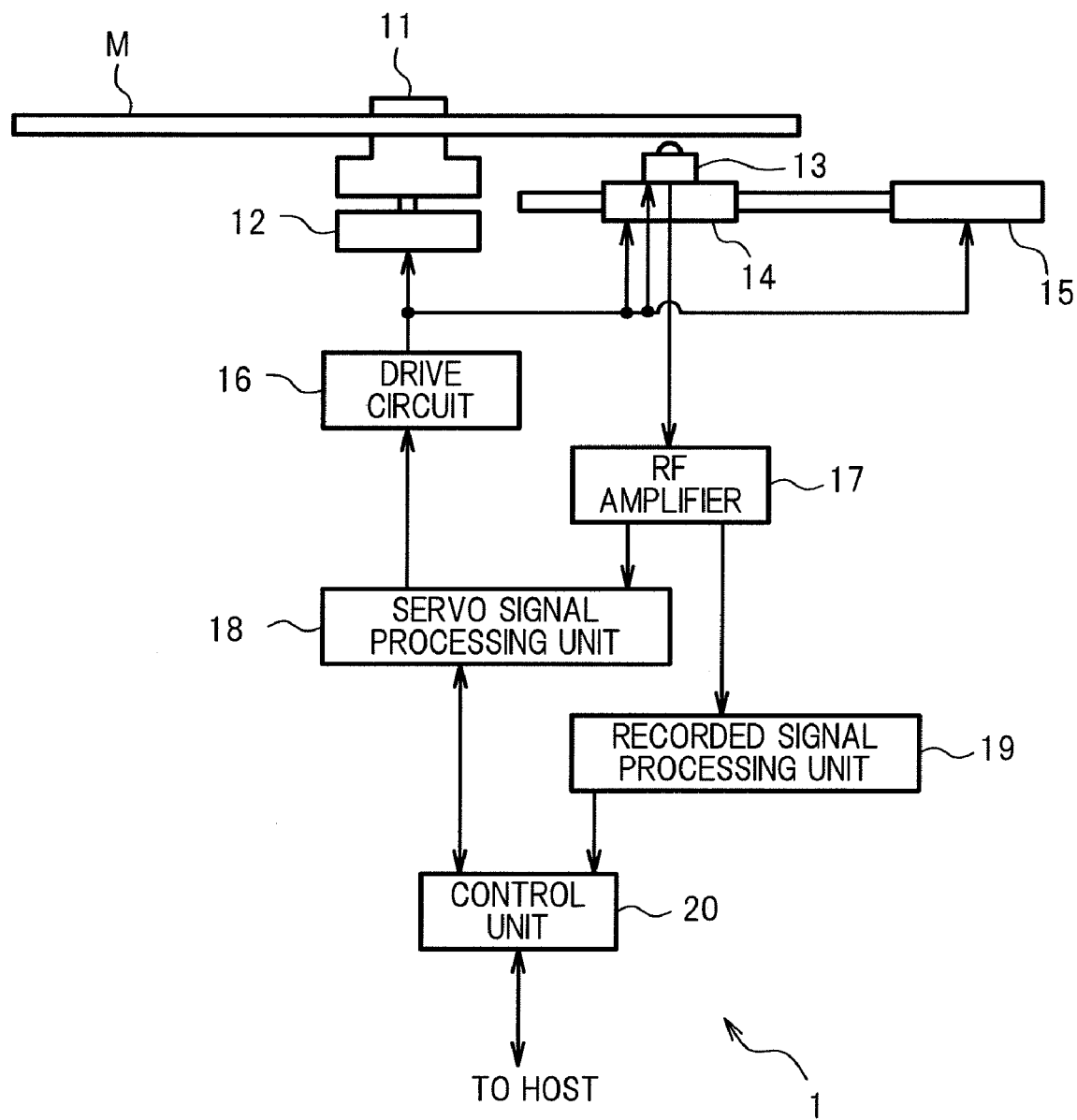
FIG. 1 is a block diagram illustrating a configuration example of an optical disc apparatus according to an embodiment of the present invention.

An optical disc apparatus 1 according to the embodiment of the present invention reads information recorded on an optical disc medium. As illustrated in FIG. 1, the optical disc apparatus 1 includes a medium supporting portion 11, a spindle motor 12, an optical pickup 13, a three-axis actuator 14, a feed motor 15, a drive circuit 16, an RF amplifier 17, a servo signal processing unit 18, a recorded signal processing unit 19, and a control unit 20.

An optical disc medium M, from which the information is to be read by the optical disc apparatus 1, includes a data recording layer on which the information is recorded, and protective layers for protecting the data recording layer, which are provided on both sides of the data recording layer. Hereinafter, a surface of the data recording layer is referred to as a signal surface. The optical disc apparatus 1 may be configured not only to read the recorded information from the optical disc medium M but also to be capable of writing the information to the optical disc medium M. Further, the optical disc apparatus 1 may also be configured to be capable of reading the information recorded on a plurality of types of optical disc media M such as a CD, a DVD, and a Blu-ray disc.

The medium supporting portion 11 rotatably supports the optical disc medium M. The medium supporting portion 11 also rotates the optical disc medium M using power transmitted from the spindle motor 12.

The optical pickup 13 irradiates the optical disc medium M with light, and detects that part of the radiated light that is reflected by the optical disc medium M to output an output signal according to the detected reflected light. The optical pickup 13 can be moved by the three-axis actuator 14 in two directions including a diameter direction of the optical disc medium M and a direction vertical to the surface of the optical disc medium M (that is, a direction along a rotation axis of the optical disc medium M). Further, the three-axis actuator 14 can change the relative tilt of the optical pickup 13 with respect to the optical disc medium M. The three-axis actuator 14 moves the optical pickup 13 in the direction vertical to the surface of the optical disc medium M to vary a distance from an objective lens 36 included in the optical pickup 13 to the surface of the optical disc medium M.

Figure 2:
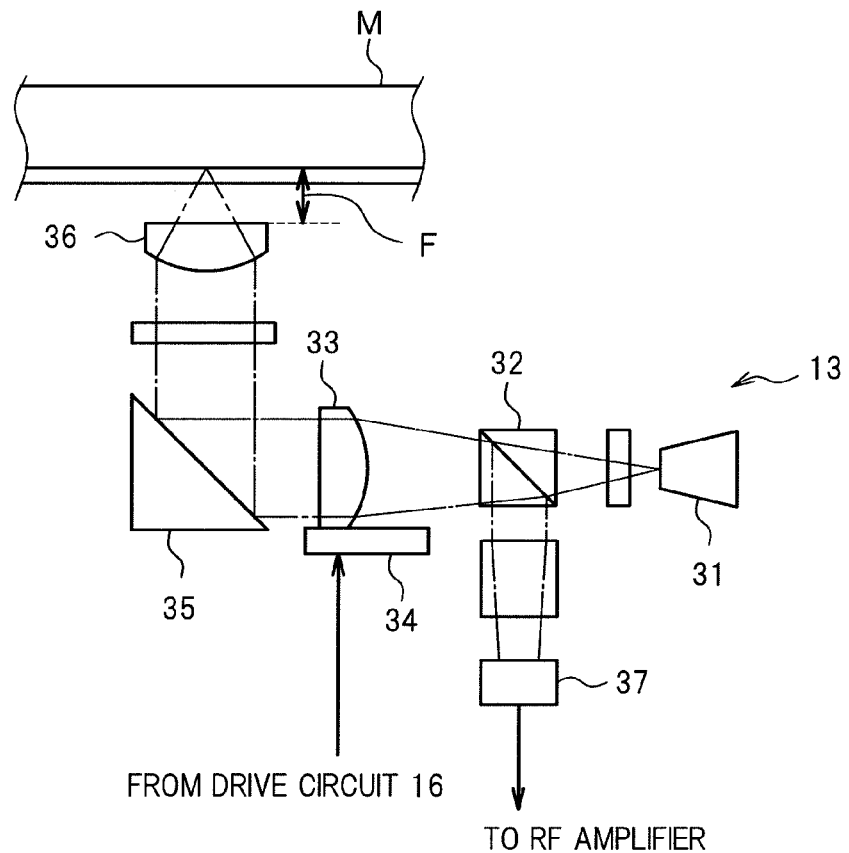
FIG. 2 is a schematic view illustrating an internal configuration example of an optical pickup of the optical disc apparatus according to the embodiment of the present invention.

FIG. 2 is a view illustrating an internal configuration example of the optical pickup 13. In the example illustrated in FIG. 2, the optical pickup 13 includes a light-emitting element 31, a polarization beam splitter 32, a collimator lens 33, a collimator lens driving unit 34, an erecting mirror 35, the objective lens 36, and a photodetector 37.

The light-emitting element 31 is a semiconductor laser element for outputting a laser beam having a predetermined wavelength. The output light emitted from the light-emitting element 31 passes through the polarization beam splitter 32 and the collimator lens 33, and is then reflected by the erecting mirror 35. Further, the output light reflected by the erecting mirror 35 is focused by the objective lens 36 on a focal position apart from the objective lens 36 by a focal length F to be reflected by the optical disc medium M.

After the light reflected by the optical disc medium M passes through the objective lens 36, the reflected light is reflected by the erecting mirror 35 to be guided by the polarization beam splitter 32 toward the photodetector 37. The photodetector 37 includes a plurality of light-receiving elements arranged in, for example, a matrix of N by N. When the reflected light guided by the polarization beam splitter 32 reaches the light-receiving elements, the photodetector 37 outputs a signal according to an intensity of the light received by each of the plurality of light-receiving elements as an output signal.

The collimator lens driving unit 34 includes an actuator and the like, and drives the collimator lens 33 forward and backward along an optical axis direction of the laser beam. The collimator lens driving unit 34 moves the collimator lens 33 along the optical axis direction to enable the correction of spherical aberration of the objective lens 36.

The feed motor 15 moves both the optical pickup 13 and the three-axis actuator 14 along the diameter direction of the optical disc medium M. By the driving of the feed motor 15, the optical pickup 13 can move from a position in the vicinity of the center of the optical disc medium M to the position in the vicinity of an outer periphery of the optical disc medium M.

The drive circuit 16 outputs driving signals for driving the collimator lens driving unit 34, the three-axis actuator 14, the spindle motor 12, and the feed motor 15 according to the control signal input from the servo signal processing unit 18. A rotation speed of the spindle motor 12 changes according to the driving signal from the drive circuit 16. As a result, a rotation speed of the optical disc medium M is controlled. Moreover, by driving the three-axis actuator 14 and the feed motor 15 according to the driving signals from the drive circuit 16, a distance of the objective lens 36 from the rotation axis of the optical disc medium M along the diameter direction, and a distance from the objective lens 36 to the surface of the optical disc medium M, are controlled.

The RF amplifier 17, the servo signal processing unit 18, the recorded signal processing unit 19, and the control unit 20 are realized by, for example, an A/D converter for converting the output signal from the optical pickup 13 into a digital signal, and a digital signal processor (DSP), a microcomputer, or the like, for processing the digital signal obtained by the conversion.

The RF amplifier 17 outputs various signals based on the respective output signals of the plurality of light-receiving elements, which are output from the optical pickup 13. Specifically, the RF amplifier 17 amplifies the output signal from each of the light-receiving elements with a given gain to output the obtained signal as an RF signal for data reproduction. The RF amplifier 17 also outputs a pull-in signal (PI signal) obtained by adding all the amplified output signals of the plurality of light-emitting elements. A level of the PI signal represents a total level of the output signals output from the optical pickup 13.

Moreover, the RF amplifier 17 calculates and outputs a focus error signal (FE signal) indicating a deviation of the focal position of the objective lens 36 with respect to the signal surface of the optical disc medium M. As an example, the FE signal is calculated by subtracting the sum of the output signals of the light-receiving elements arranged along a predetermined diagonal direction from the sum of the output signals of the light-receiving elements arranged along a diagonal direction crossing the predetermined diagonal direction from among the plurality of light-receiving elements. Further, the RF amplifier 17 calculates and outputs a tracking error signal (TE signal) indicating a deviation in the diameter direction of the optical disc medium M between a position of a track in the data recording layer, on which the information is recorded, and the focal position of the objective lens 36.

The servo signal processing unit 18 generates various signals for servo control based on the PI signal, the FE signal, and the TE signal which are output from the RF amplifier 17, and outputs the generated signals to the control unit 20. The servo signal processing unit 18 outputs a control signal to the drive circuit 16 for driving the three-axis actuator 14, the collimator lens driving unit 34, the feed motor 15, and the spindle motor 12 according to a command input from the control unit 20.

In this embodiment, the servo signal processing unit 18 functions as a servo implementation unit for performing servo control according to a command from the control unit 20. Specifically, upon input of the command for starting the servo control from the control unit 20, the servo signal processing unit 18 outputs the control signal for controlling the three-axis actuator 14 according to the FE signal input from the RF amplifier 17 to perform the focus servo control for the positional adjustment of the optical pickup 13 in a direction vertical to the surface of the optical disc medium M. As a result, the focus of the objective lens 36 is maintained on the signal surface of the optical disc medium M. Moreover, the servo signal processing unit 18 outputs the control signal for controlling the three-axis actuator 14 according to the TE signal input from the RF amplifier 17 to perform the tracking servo control for changing the position of the optical pickup 13 in the diameter direction. As a result, the optical pickup 13 moves relatively in a direction parallel to the surface of the optical disc medium M to cause the focus of the objective lens 36 to follow the track in the data recording layer. In this manner, the relative position of the optical pickup 13 with respect to the surface of the optical disc medium M is controlled by the servo control performed by the servo signal processing unit 18. As a result, the state where the optical pickup 13 can read the information from the optical disc medium M can be maintained, and the information is read in such a state. When a servo error occurs (that is, the servo control can no longer be continued) due to the effects of a disturbance or the like, the servo signal processing unit 18 outputs a signal for notifying the occurrence of the servo error to the control unit 20.

The recorded signal processing unit 19 demodulates the RF signal output from the RF amplifier 17 into a digital signal indicating the information recorded on the optical disc medium M, and outputs the demodulated digital signal. The recorded signal processing unit 19 also calculates an evaluation value (such as RF amplitude or jitter value) for reading accuracy of the optical pickup 13 for the information recorded on the optical disc medium M, and outputs the calculated evaluation value to the control unit 20. Hereinafter, as a specific example, the recorded signal processing unit 19 measures the jitter value indicating a time deviation of rising timing of an RF signal waveform with respect to a reference clock as the evaluation value, and outputs the measured jitter value to the control unit 20.

The control unit 20 is constituted by, for example, a microcomputer, and includes an execution module and a storage element. In the storage element of the control unit 20, a program to be executed and various parameters are stored. The execution module performs processing according to the program stored in the storage element. Specifically, the control unit 20 receives the input of signals from the servo signal processing unit 18 (such as a signal for the result of peak detection of the PI signal and a signal indicating the result of predetermined judgment performed on the FE signal), and performs processing (focus detection processing) for detecting a position at which the focus of the objective lens 36 is adjusted to be on the signal surface, based on the signals, and for setting a distance between the optical pickup 13 and the optical disc medium M to be at the detected position. When the focus detection is performed by the focus detection processing, the control unit 20 outputs a command for starting the focus servo control, to the servo signal processing unit 18, to maintain the state after the focus detection.

The control unit 20 is connected to a personal computer, a main body of a home game machine, a video decoder or the like, which serves as a host. In response to a request from the host, the control unit 20 outputs an instruction for driving the feed motor 15 or the three-axis actuator 14 to the servo signal processing unit 18 to move the focal position of the objective lens 36 (that is, an information reading position on the optical disc medium M) to a desired position on the optical disc medium M. In addition to the operation described above, the control unit 20 outputs an instruction for changing a rotation speed of the spindle motor 12 to the servo signal processing unit 18, to adjust the rotation speed of the optical disc medium M. Then, in this state, the control unit 20 outputs the signal obtained by demodulating the signal read from the optical disc medium M, which is output from the recording signal processing unit 19, to the host side.

[Concept of Parameter Adjustment Operation]

In this embodiment, the optical disc apparatus 1 performs a parameter adjustment operation on a predetermined control parameter set for the servo control performed by the servo signal processing unit 18. In the parameter adjustment operation, a set value of the control parameter to be set for the implementation of the servo control (hereinafter, referred to as an adjusted value) is calculated. Specifically, the optical disc apparatus 1 calculates the set value of the control parameter, which allows the information recorded on the optical disc medium M to be read with good accuracy, as the adjusted value. By setting the value of the control parameter to the adjusted value calculated by the parameter adjustment operation, the optical disc apparatus 1 can implement the servo control under desirable conditions to read the information from the optical disc medium M with good accuracy.

The parameter adjustment operation is performed when, for example, the optical disc medium M is newly placed in the optical disc apparatus 1 or the optical disc apparatus 1 is powered ON. This is because the value of the control parameter which allows the information to be read with good accuracy varies depending on the type or individual variability of the optical disc medium M. Once the parameter adjustment operation is performed, the value of the control parameter is set to the calculated adjusted value. Thereafter, the servo control is performed with the adjusted value being set for the same optical disc medium M. When the parameter adjustment operation is to be performed, it is necessary to actually read the information from the optical disc medium M to calculate the jitter value at the time of information reading. Therefore, the optical disc apparatus 1 performs the parameter adjustment operation while the servo control is being performed by the servo signal processing unit 18.

[Parameter Adjustment Operation for a Single Control Parameter]

Hereinafter, an example where the parameter adjustment operation is performed for a single control parameter is first described. As an example of the control parameter, a case where a parameter for the position of the collimator lens 33 (hereinafter, referred to as an SA parameter) is adjusted is described. The collimator lens driving unit 34 changes the position of the collimator lens 33 according to the adjusted SA parameter. As a result, the optical pickup 13 can correct the spherical aberration of the objective lens 36 to read the information with good accuracy.

Figure 3:
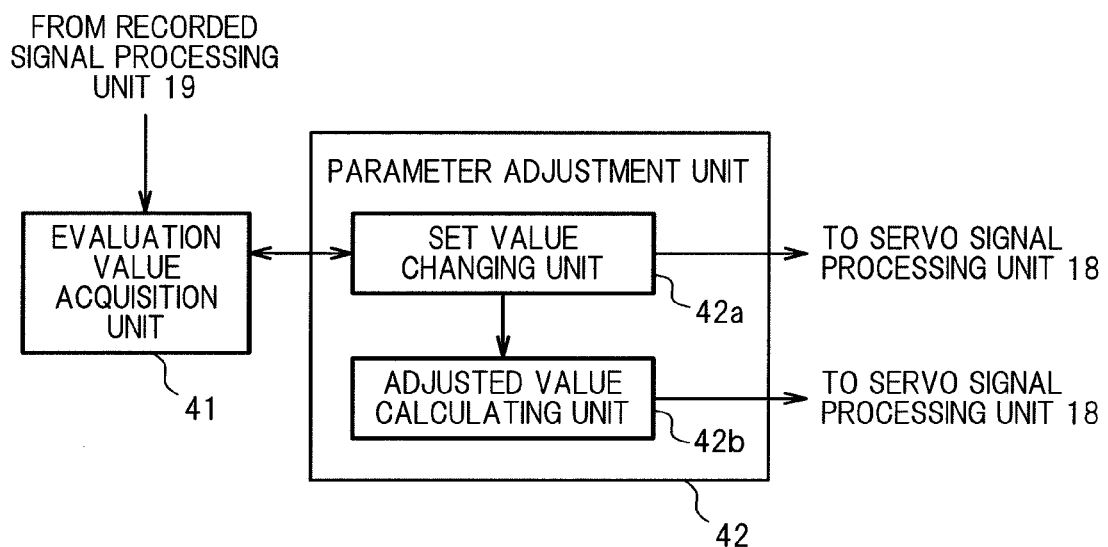
FIG. 3 is a functional block diagram illustrating an example of functions of the optical disc apparatus according to the embodiment of the present invention.

Processing performed by the control unit 20 of the optical disc apparatus 1 according to this embodiment when the parameter adjustment operation is performed is described below. As illustrated in FIG. 3, the control unit 20 functionally includes an evaluation value acquisition unit 41 and a parameter adjustment unit 42. Further, the parameter adjustment unit 42 functionally includes a set value changing unit 42a and an adjusted value calculating unit 42b. The functions described above are realized in the form of software by the execution of the program stored in the storage element included in the control unit 20 by the control unit 20.

The evaluation value acquisition unit 41 acquires the evaluation value (jitter value) measured by the recorded signal processing unit 19 based on the RF signal from the recorded signal processing unit 19 each time the set value is changed by the set value changing unit 42a described below.

The set value changing unit 42a of the parameter adjustment unit 42 changes the set value of the SA parameter according to a predetermined rule, and outputs the changed set value to the servo signal processing unit 18 to change the position of the collimator lens 33. The rule on the change of the set value is described in detail below. Then, each time the set value changing unit 42a changes the set value of the SA parameter, the jitter value when the set value is set is acquired by the evaluation value acquisition unit 41. As a result, the jitter value corresponding to each of a plurality of the set values of the SA parameter is obtained. The set value changing unit 42a repeats changing the set value until a plurality of combinations of the set value and the jitter value, which satisfy a predetermined condition, are acquired. In the following description, the combination of the set value and the jitter value, which is acquired by the change of the set value by the set value changing unit 42a, is referred to as a sample data item.

The adjusted value calculating unit 42b calculates the adjusted value based on the sample data items. As a specific example, the adjusted value calculating unit 42b uses a least square method to obtain a quadratic curve for approximating the obtained sample data items. Then, the adjusted value calculating unit 42b calculates a set value of the SA parameter corresponding to the position of a vertex of the quadratic curve as the adjusted value. Thereafter, the adjusted value calculating unit 42b outputs the calculated adjusted value to the servo signal processing unit 18 to move the position of the collimator lens 33 to the position according to the adjusted value. As a result, the spherical aberration is corrected to a desirable condition to allow the recorded signal processing unit 19 to read the information recorded on the optical disc medium M with good accuracy.

Hereinafter, the rule on the change of the set value when the set value changing unit 42a sequentially changes the set value to obtain a plurality of sample data items is described below.

First, the set value changing unit 42a sets a predetermined initial value X0 as the set value for acquiring the first sample data item. The initial value X0 is, for example, a value such that the possibility of successfully acquiring the jitter value is supposed to be statistically high. Such an initial value X0 can be determined as a result of examination carried out in advance on the relation between the set value and the jitter value for various types of optical disc media. By setting the thus determined initial value X0, there is obtained a high possibility of successfully reading the information from the optical disc medium M to obtain the jitter value in the initial measurement regardless of a variation in the adjusted value to be obtained, which is caused depending on the individual variability of the optical disc medium M.

When the jitter value is successfully acquired for the initial value X0, the set value changing unit 42a sets the set value of the SA parameter for the second measurement to a value obtained by changing the initial value X0 by a predetermined step amount d. As in the case of the initial value X0, the step amount d may be determined according to the range of the SA parameter which allows the measurement of the jitter value, which is obtained as a result of the examination carried out in advance on various types of optical disc media. The set value changing unit 42a may increase the SA parameter by the step amount d with respect to the initial value X0 (that is, adds the step amount d to the initial value X0) or may decrease the SA parameter by the step amount d with respect to the initial value X0 (that is, subtracts the step amount d from the initial value X0). As a specific example described below, the set value changing unit 42a sets the SA parameter to (X0−d) for the second measurement.

When the jitter values are respectively measured in the above-mentioned manner for the set values X0 and (X0−d), the set value changing unit 42a determines the set value to be set for further acquiring the evaluation value according to the jitter values acquired for the two set values. As a specific example, the set value changing unit 42a determines the set value of the SA parameter corresponding to a target of the next measurement according to the magnitude relation between two jitter values respectively corresponding to the two set values. That is, when the evaluation value acquired by the evaluation value acquisition unit 41 with a set value X being set, is denoted by Y(X), the set value changing unit 42a determines the set value of the SA parameter to be changed next according to the magnitude relation between Y(X0) and Y(X0−d).

Specifically, when Y(X0) is smaller than Y(X0−d) in the comparison between Y(X0) and Y(X0−d), the set value changing unit 42a changes the SA parameter to a set value larger than X0 ((X0+d) in this case). On the other hand, when Y(X0−d) is smaller than Y(X0), the set value changing unit 42a changes the SA parameter to a set value smaller than (X0−d) ((X0−2d) in this case).

Further, the set values of the SA parameter, which respectively correspond to targets of the fourth and subsequent measurements, are determined by the same method. Specifically, according to the magnitude relation between two evaluation values Y(XH) and Y(XL) acquired respectively for a maximum value XH and a minimum value XL of the set values, for which the jitter values are already acquired, the set value changing unit 42a determines that the set value to be further changed is made larger than the maximum value XH or smaller than the minimum value XL. As a specific example, when the relation: Y(XH)<Y(XL) is established, the set value changing unit 42a changes the set value to (XH+d). On the other hand, when the relation: Y(XH)>Y(XL) is established, the set value changing unit 42a changes the set value to (XL−d).

The evaluation value acquisition unit 41 and the set value changing unit 42a repeat changing the set value and acquiring the jitter value measured with the changed set value as described above until a plurality of sample data items allowing the adjusted value calculation unit 42b to calculate the adjusted value with good accuracy are obtained. In order to approximate the sample data items to calculate the adjusted value with good accuracy, it is desirable to acquire three or more sample data items which satisfy a predetermined condition. A condition for judging whether or not such sample data items have been acquired, so as to determine whether or not the acquisition of the sample data items is to be terminated (measurement termination condition), is described below.

Figure 4:
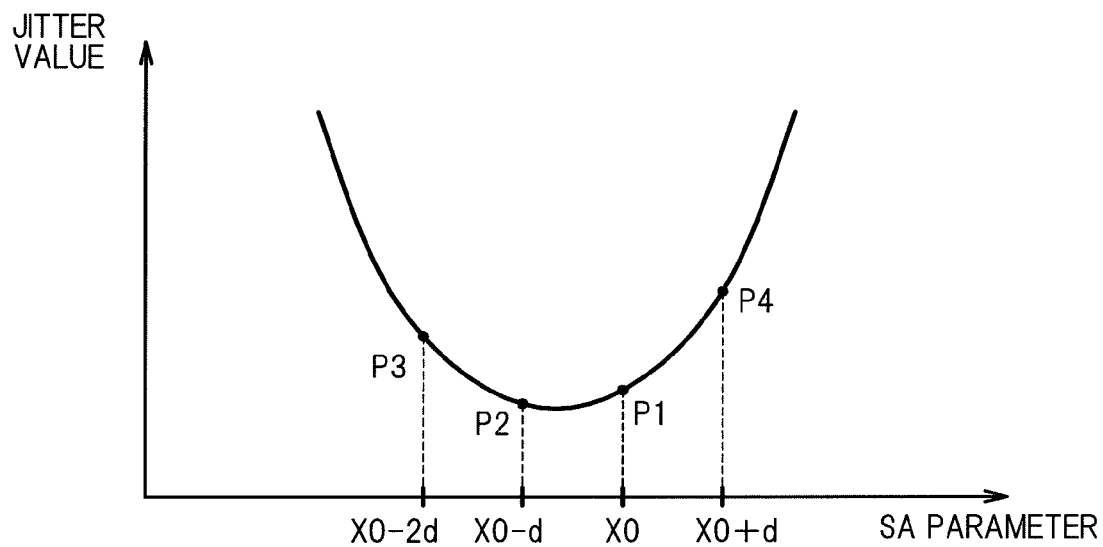
FIG. 4 is a graph showing an example of a relation between an evaluation value to be acquired and an order of changing a set value.
Figure 5:
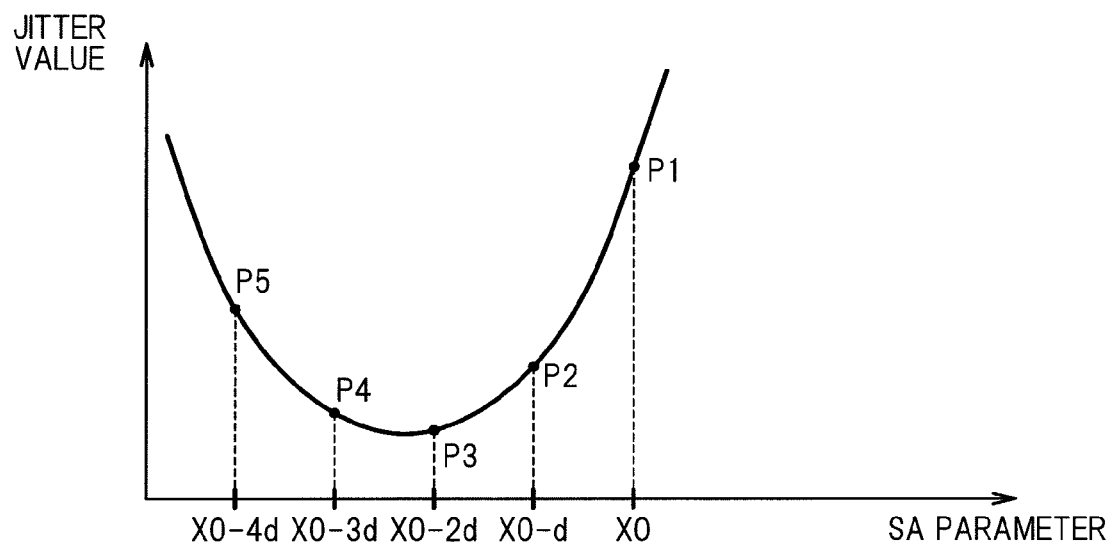
FIG. 5 is a graph showing another example of the relation between the evaluation value to be acquired and the order of changing the set value.
Figure 6:
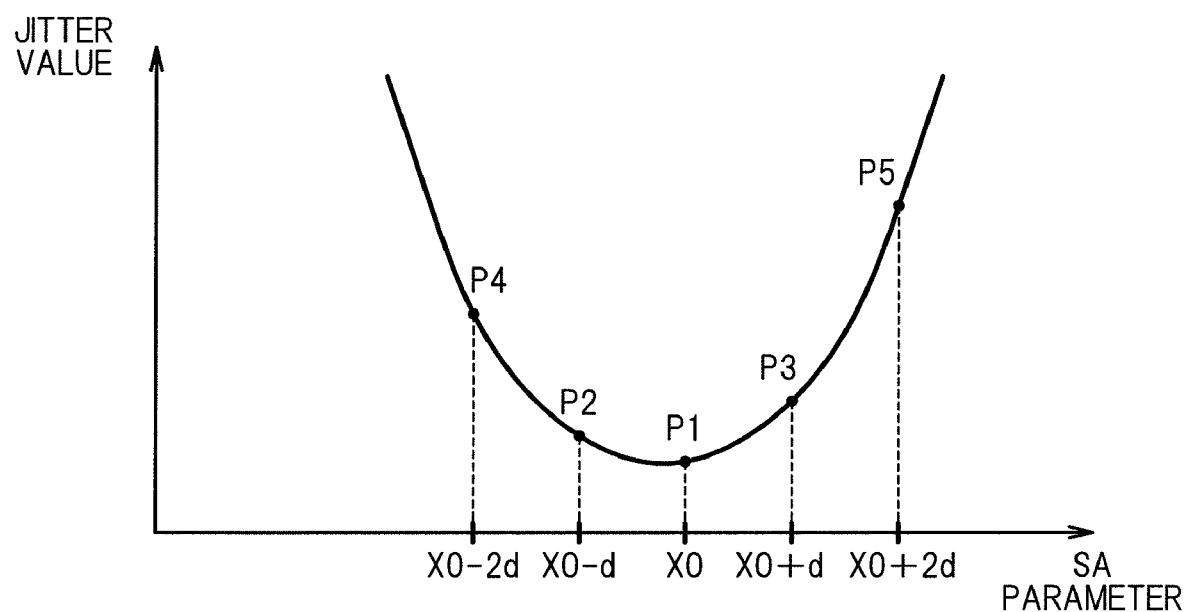
FIG. 6 is a graph showing still another example of the relation between the evaluation value to be acquired and the order of changing the set value.

Each of FIGS. 4, 5, and 6 is a graph showing an example of the relation between the set value and the jitter value determined in the above-mentioned manner. In each of FIGS. 4 to 6, an abscissa axis represents the set value of the SA parameter, whereas an ordinate axis represents the jitter value. A positive direction of the abscissa axis indicates a direction of the movement of the collimator lens 33 toward the erecting mirror 35, whereas a negative direction indicates a direction of the movement of the collimator lens 33 toward the light-emitting element 31. Points P1, P2, P3, P4, and P5 on each of the graphs represent sample data items obtained by the first, second, third, fourth, and fifth measurements, respectively.

In FIG. 4, the jitter value at the point P2 is smaller than that at the point P1. Therefore, the set value for the third measurement is to be smaller than the set value at the point P2. As a result, when the third measurement is completed, the set value at the point P3 becomes the new minimum value XL. Since the jitter value at the point P3 is larger than that at the point P1, the fourth measurement is performed with the set value larger than the set value at the point P1.

In an example illustrated in FIG. 5, the jitter value at the point P1 is the largest of the jitter values at the points P1 to P5. Therefore, the set value is continuously changed in the negative direction of the X-axis until the fifth measurement.

FIG. 6 illustrates an example in the case where the jitter value obtained by the first measurement is positioned in the vicinity of the vertex of the quadratic curve. In this example, the measurements are performed while the set value is changed alternately in the negative direction of the X-axis and the positive direction of the X-axis from the first measurement.

As illustrated in FIGS. 4 to 6, according to the magnitude relation between the jitter values respectively corresponding to the maximum value and the minimum value of the set values, for which the jitter values are already measured, the set value to be set for the next measurement is determined to be set larger than the maximum value or smaller than the minimum value. As a result, the set value changing unit 42a can change the set value in the following manner. Specifically, in the case where the relation between the set value and the jitter value is approximated by the quadratic curve, the set value is changed to be closer to the vertex of the quadratic curve while the vertex of the quadratic curve is not situated between the maximum value and the minimum value of the already measured set values, as exemplified in FIG. 5. When the vertex of the quadratic curve is situated between the maximum value and the minimum value of the already measured set values, the set value is changed to enlarge the range of measurement in both the positive direction and the negative direction of the X-axis from the vertex as a center of enlargement, as exemplified in FIG. 6. Therefore, the optical disc apparatus 1 according to this embodiment can acquire the sample data items containing three points necessary for the adjusted value calculating unit 42b to calculate the adjusted value, that is, the point at which a slope of a tangent with respect to the quadratic curve becomes negative, the point at which the slope of the tangent is close to zero, and the point at which the slope of the tangent becomes positive, with a small number of measurements. As a result, the parameter adjustment operation can be performed in a short period of time.

Figure 7:
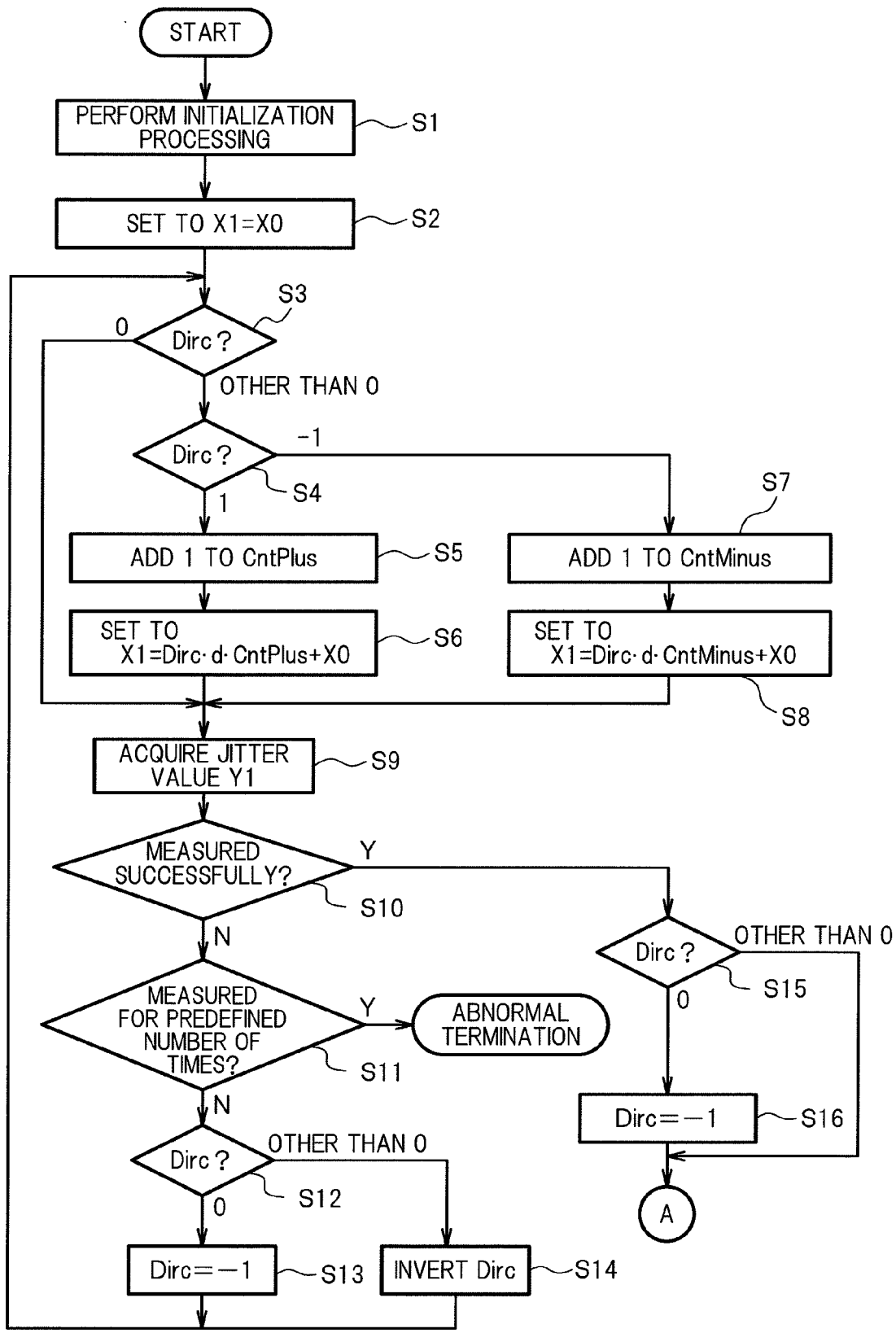
FIG. 7 is a flowchart illustrating an example of processing performed by the optical disc apparatus according to the embodiment of the present invention.
Figure 8:
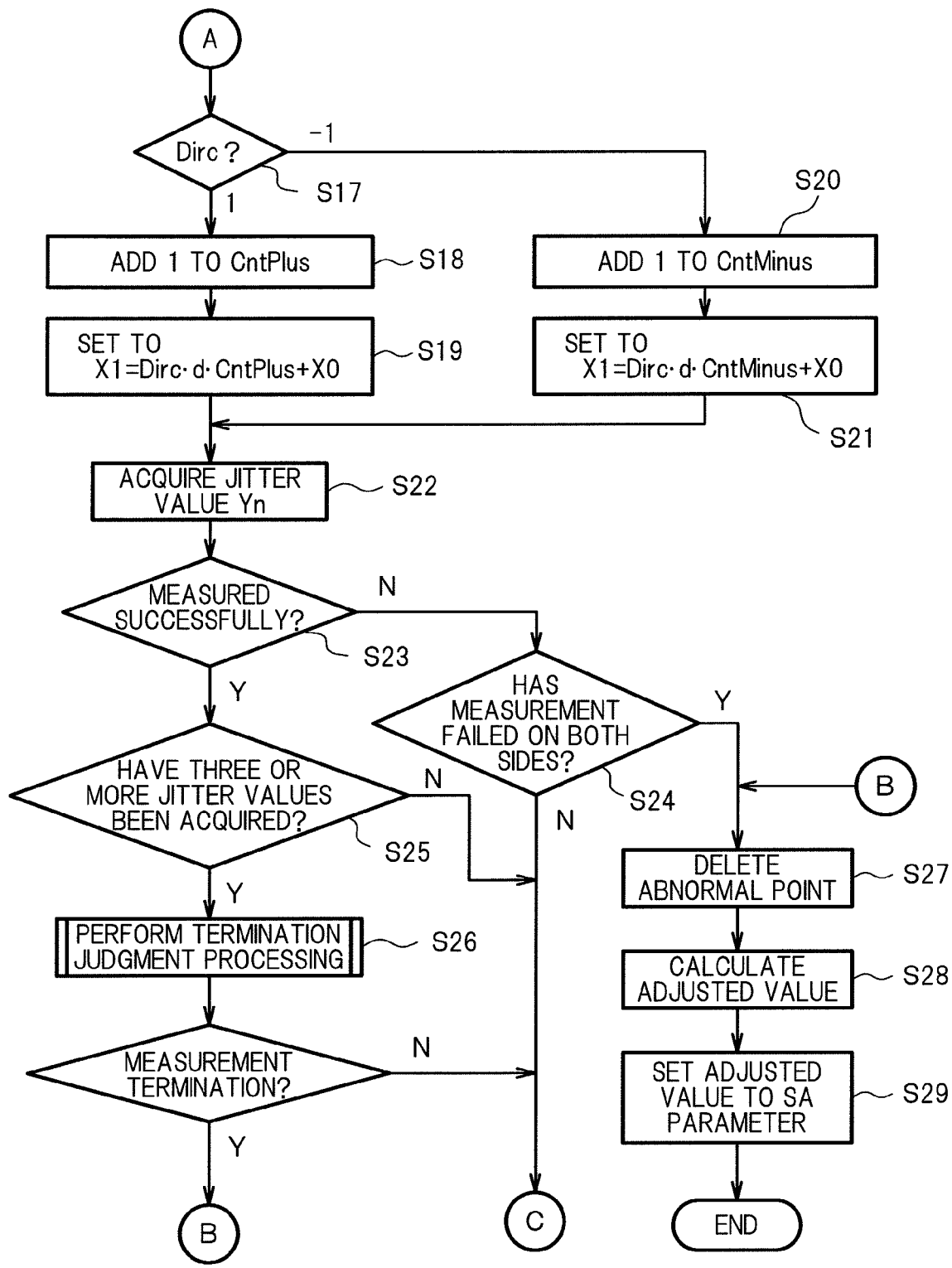
FIG. 8 is a flowchart illustrating the example of the processing performed by the optical disc apparatus according to the embodiment of the present invention.
Figure 9:
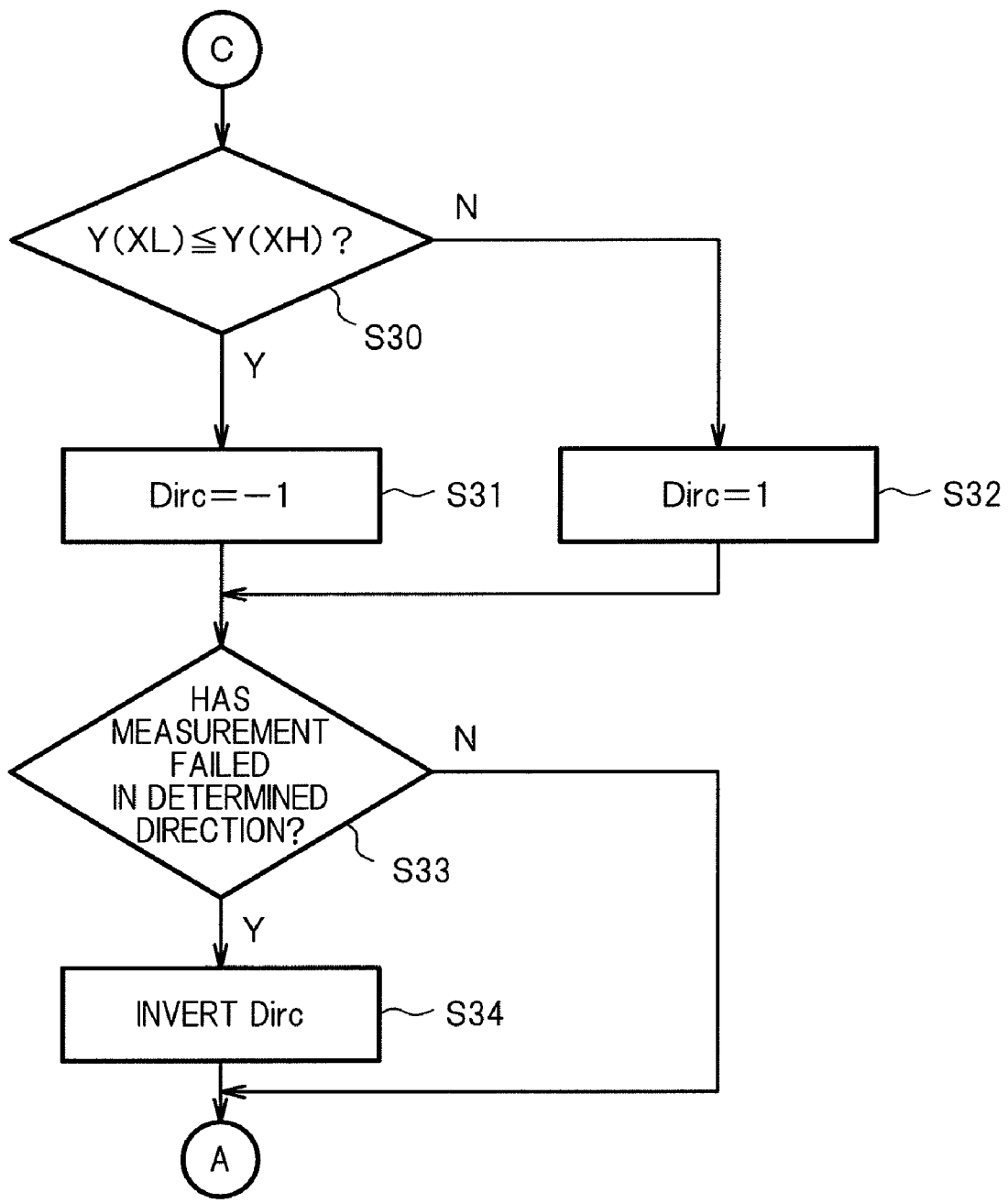
FIG. 9 is a flowchart illustrating the example of the processing performed by the optical disc apparatus according to the embodiment of the present invention.

A specific example of a flow of processing performed by the control unit 20 in this embodiment will be described referring to flowcharts of FIGS. 7 to 9. The set value of the SA parameter, which is set by the set value changing unit 42a for acquiring the n-th sample data item, is denoted by Xn. The jitter value, which is measured with the set value Xn being set, is denoted by Yn.

First, the set value changing unit 42a resets each of variables as predetermined initialization processing (S1). Specifically, 0 is set as each of a Dirc variable, a CntPlus variable, and a CntMinus variable. Here, the Dirc variable indicates a direction in which the set value changing unit 42a changes the set value. The Dirc variable of −1 indicates a change in the negative direction, +1 indicates a change in the positive direction, and 0 indicates a state where the direction is not set. The CntPlus variable indicates the number of times of changing the set value to be measured in the positive direction of the X-axis, whereas the CntMinus variable indicates the number of times of changing the set value to be measured in the negative direction of the X-axis with the predetermined initial value X0 being used as a reference.

Subsequently, the set value changing unit 42a sets the predetermined initial value X0 as a set value X1 for the first measurement (S2). According to this setting, the collimator lens driving unit 34 moves the collimator lens 33 to a predetermined initial position.

Next, the set value changing unit 42a judges whether the Dirc variable is 0 or not (S3). Since 0 is set as the Dirc variable in the initialization processing as described above, it is determined in Step S3 performed for the first time that the Dirc variable is 0 and the processing proceeds to Step S9. On the other hand, when the processing in Step S3 is performed for the second and subsequent times, the Dirc variable is set to a value other than 0. Therefore, the set value changing unit 42a changes the set value according to the value of the Dirc variable. Specifically, the set value changing unit 42a judges that the Dirc variable is 1 or −1 (S4). When the Dirc variable is 1, the set value changing unit 42a adds 1 to the CntPlus variable (S5) and sets a value calculated by a calculation formula:

$$X1 = Dirc \cdot d \cdot CntPlus + X0$$

as the new set value X1 (S6). On the other hand, when the Dirc variable is −1, the set value changing unit 42a adds 1 to the CntMinus variable (S7) and sets a value calculated by a calculation formula:

$$X1 = Dirc \cdot d \cdot CntMinus + X0$$

as the new set value X1 (S8).

The jitter value is then measured in this state. A jitter value Y1 obtained as a result of the measurement is acquired by the evaluation value acquisition unit 41 (S9). Then, the set value changing unit 42a judges whether or not the jitter value has been successfully measured (S10). If the measurement of the jitter value has failed, it is judged whether or not the measurement has been performed a predefined number of times or more (S11). If the jitter value has never been successfully measured, even after the predefined number of times of the measurement while the set value is being changed as described below, the set value changing unit 42a judges that an error has occurred to terminate the parameter judgment operation (abnormal termination).

On the other hand, when it is judged in Step S11 that the measurement has not yet been performed the predefined number of times, the set value changing unit 42a judges whether the Dirc variable is 0 or not (S12). When the Dirc variable is 0, −1 is set as a new value of the Dirc variable (S13). In this manner, when the first measurement fails, the set value X1 of the SA parameter is first changed in the negative direction to reattempt the measurement. On the other hand, when the Dirc variable is not 0, the set value changing unit 42a inverts the Dirc variable (S14). Specifically, when the Dirc variable is 1, the value of the Dirc variable is changed to −1. On the other hand, when the Dirc variable is −1, the value of the Dirc variable is changed to 1. Then, the processing returns to Step S3 to change the set value to the new set value X1 according to the inverted Dirc variable.

Figure 10:
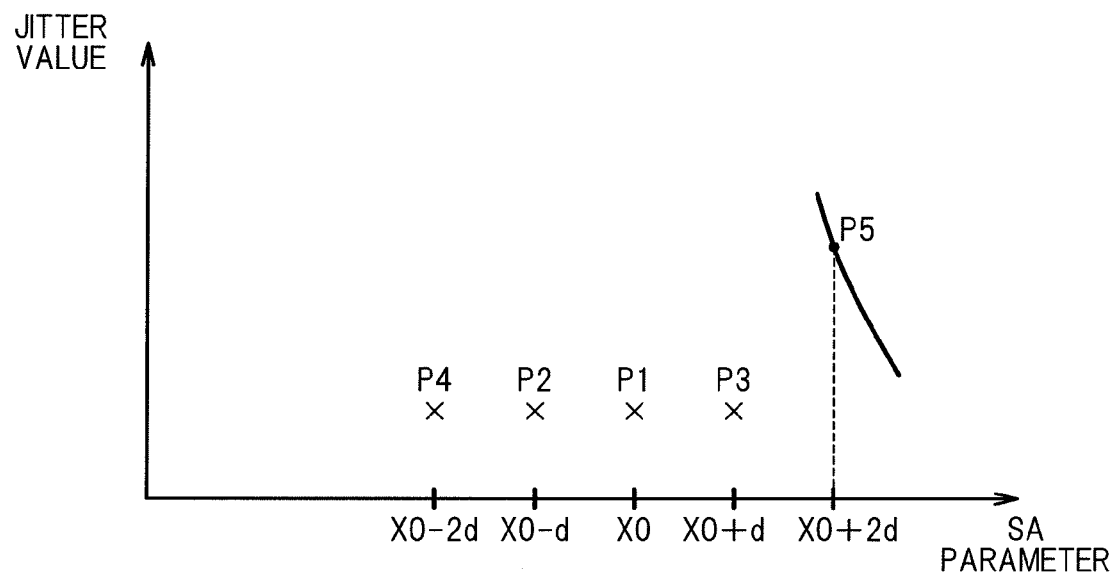
FIG. 10 is an explanatory graph showing an example of the order of changing the set value when acquisition of the evaluation value fails with an initial value being set.

According to the flow described above, when the measurement of the jitter value fails with the initial value X0 being set, the set value is alternately changed in the negative direction and the positive direction of the X-axis about the initial value x0 as a center to attempt to measure the jitter value, as illustrated in FIG. 10. In the example illustrated in FIG. 10, a cross indicates an unsuccessful measurement. Therefore, FIG. 10 shows that the fifth measurement is the first successful measurement of the jitter value. As described above, the initial value X0 is set not in the vicinity of both ends of the range in which the SA parameter can be set, but to a value which provides a high possibility of successful measurement of the jitter value. Therefore, it is expected that the jitter value can be successfully measured earlier by repeating the measurement of the jitter value while alternately decreasing and increasing the set value, rather than by repeating the measurement of the jitter value while constantly increasing or decreasing the set value from the initial value X0.

As one of the reasons for the abnormal termination of the parameter adjustment operation, it is conceived that the range in which the jitter value can be measured is too small compared with the step amount d to successfully measure the jitter value. Therefore, in the case of the abnormal termination of the parameter adjustment operation as a result of the judgment in Step S11, the optical disc apparatus 1 may change the step amount d to a smaller value to perform the parameter adjustment operation again. In this case, the parameter adjustment operation may be performed again with an increased number of times of the measurement, which serves as a criterion of the occurrence of the error in Step S11.

When it is judged in Step S10 that the jitter value Y1 for the set value X1 is successfully measured, the set value changing unit 42a judges whether the Dirc variable is 0 or not (S15). When the Dirc variable is 0, it means that the jitter value Y1 has been successfully measured on the first attempt. In this case, −1 is set as the Dirc variable (S16). Since the set value is first changed in the negative direction in the second measurement in this embodiment as described above, the Dirc variable is set to −1 in this case. When the Dirc variable is a value other than 0 in Step S15, it means that the first measurement has failed and the measurement of the jitter value Y1 has been attempted several times. In this case, the Dirc variable is left unchanged. Then, after the set value is changed to a next value while the direction, in which the set value was changed the last time, is being maintained, the second and subsequent measurements are performed.

Specifically, the set value changing unit 42a judges that the Dirc variable is 1 or −1 (S17). When the Dirc variable is 1, the set value changing unit 42a adds 1 to the CntPlus variable (S18) and sets a value calculated by a calculation formula:

$$Xn = Dirc \cdot d \cdot CntPlus + X0$$

as the set value Xn (S19). On the other hand, when the Dirc variable is −1, the set value changing unit 42a adds 1 to the CntMinus variable (S20) and sets a value calculated by a calculation formula:

$$Xn = Dirc \cdot d \cdot CntMinus + X0$$

as the set value Xn (S21).

Thereafter, the evaluation value acquisition unit 41 acquires the jitter value Yn measured for the SA parameter set in Step S19 or S21 (S22). Then, the set value changing unit 42a judges whether or not the jitter value Yn has been successfully acquired in Step S22 (S23).

When it is judged in Step S23 that the acquisition of the jitter value Yn has failed, the set value changing unit 42a judges on both sides of the range of the set values, for which the jitter values were measured, whether or not the measurement of the jitter value has failed (S24). Specifically, it is judged whether or not the acquisition of the jitter value has failed for the set value larger than the maximum value of the set values, for which the measurement was successful, and the set value smaller than the minimum value of the set values, for which the measurement was successful. When this condition is satisfied, it is assumed that the jitter value will not be successfully measured even if the set value is further changed.

Thus, the processing proceeds to Step S27 to calculate the adjusted value by using the successfully measured jitter values.

On the other hand, when it is judged in Step S23 that the jitter value Yn has been successfully acquired, it is further judged whether or not three or more jitter values have been acquired by the processing in Steps S9 and S22 (S25). If three or more jitter values have been acquired, the set value changing unit 42a performs termination judgment processing for judging whether or not a predetermined measurement termination condition is satisfied on the sample data items (S26). The contents of the termination judgment processing are described below.

Figure 11:
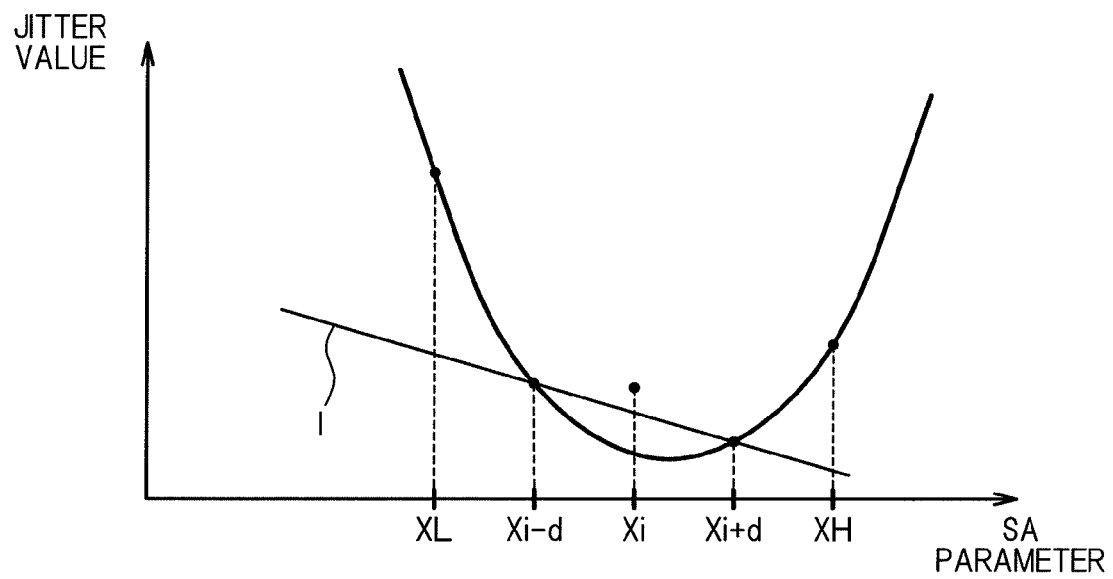
FIG. 11 is a graph for illustrating a method of judging an abnormal value.

When it is judged by the processing in Step S26 that the termination judgment condition is satisfied (that is, it is judged that the measurement is to be terminated) and it is judged in Step S24 that the measurement of the jitter value has failed on both sides of the set value, the adjusted value calculating unit 42b uses the sample data items obtained in S9 and S22 to calculate the adjusted value. Specifically, the adjusted value calculating unit 42b first performs processing for deleting an abnormal point from the sample data items (S27). Specifically, each of the set values obtained by excluding the maximum value XH and the minimum value XL from the set values, for which the jitter values have been acquired, is determined as a target set value Xi. It is judged by the following judgment method whether or not a jitter value Yi obtained for the target set value Xi is abnormal data generated due to an error. That is, it is judged whether or not the jitter value Yi obtained for the target set value Xi is larger than an average value of jitter values Y(Xi−d) and Y(Xi+d) respectively obtained for set values (Xi−d) and (Xi+d) situated on both sides of the target set value Xi. The judgment is for judging whether a sample point corresponding to the target set value Xi is situated above or below a straight line 1 connecting the two sample points on both sides of the target set value Xi on a graph showing the relation between the set value and the jitter value, as illustrated in FIG. 11. The graph is supposed to be represented by a concave upward parabola. Therefore, when the sample point corresponding to the target set value Xi is situated above the straight line 1 as in the example illustrated in FIG. 11, the jitter value Yi is assumed to be an abnormal value generated due to a measurement error. Therefore, the adjusted value calculating unit 42b excludes the combination of the abnormal target set value Xi and the corresponding jitter value Yi, which satisfies the above-mentioned condition, from the data used for subsequent adjusted value calculation processing.

Next, the adjusted value calculating unit 42b uses the remaining sample data items after the exclusion of the abnormal point in Step S27 to calculate the adjusted value (S28). Specifically, the adjusted value calculating unit 42b calculates a quadratic curve for approximating the sample data items by the least square method, and calculates the set value corresponding to the position of the vertex of the quadratic curve as the adjusted value. Then, after the calculated adjusted value is set as the set value of the SA parameter (S29), the parameter adjustment processing is terminated. As a result, the collimator lens 13 is moved by the collimator lens driving unit 14 to a position according to the adjusted value. Subsequently, the focus servo control is performed under the condition where the jitter value decreases.

When it is judged in Step S24 that the measurement of the jitter value has not failed on both sides, when it is judged in Step S25 that three or more jitter values have not been acquired yet, or when it is judged in Step S26 that the measurement termination condition has not been satisfied (that is, it is judged that the measurement is to be continued), the set value changing unit 42a determines the direction in which the set value is to be changed next according to the jitter values acquired until then. Specifically, the set value changing unit 42a first compares in magnitude a jitter value Y(XH) corresponding to the maximum value XH of the set values, for which the jitter values have been successfully measured, and a jitter value Y(XL) corresponding to the minimum value XL of the set values, for which the jitter values have been successfully measured (S30). When the relation: $Y(XL) \leq Y(XH)$ is established, −1 is set as the Dirc variable (S31). On the other hand, when the relation: $Y(XL) > Y(XH)$ is established, 1 is set as the Dirc variable (S32). Then, it is judged whether or not there is already any set value, for which the measurement of the jitter value has failed, in the direction determined in Step S31 or S32 (S33). Specifically, when the Dirc variable is −1, it is judged whether or not the measurement of the jitter value has failed for the set value smaller than the minimum value XL. When the Dirc variable is 1, it is judged whether or not the measurement of the jitter value has failed for the set value larger than the maximum value XH.

When it is judged in Step S33 that there is no set value, for which the measurement of the jitter value has failed, the set value changing unit 42a returns to Step S17 to change the set value to a next value. On the other hand, when it is judged in Step S33 that there is a set value, for which the measurement of the jitter value has failed, the set value changing unit 42a inverts the value of the Dirc variable set in Step S31 or S32 (S34). Then, the set value changing unit 42a returns to Step S17 to change the set value to a next value. By the processing described above, the SA parameter is adjusted.

Figure 12:
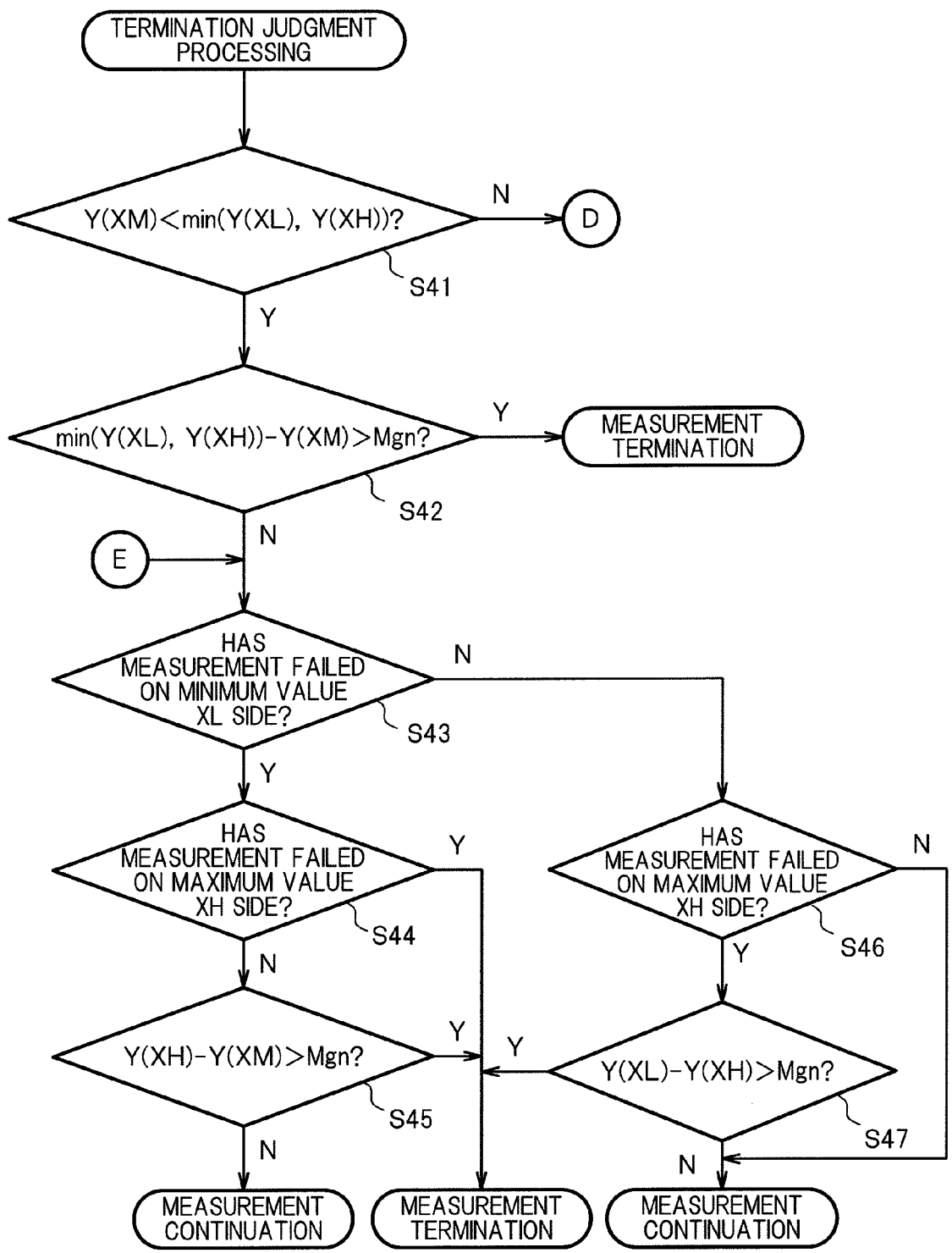
FIG. 12 is a flowchart illustrating an example of termination judgment processing.
Figure 13:
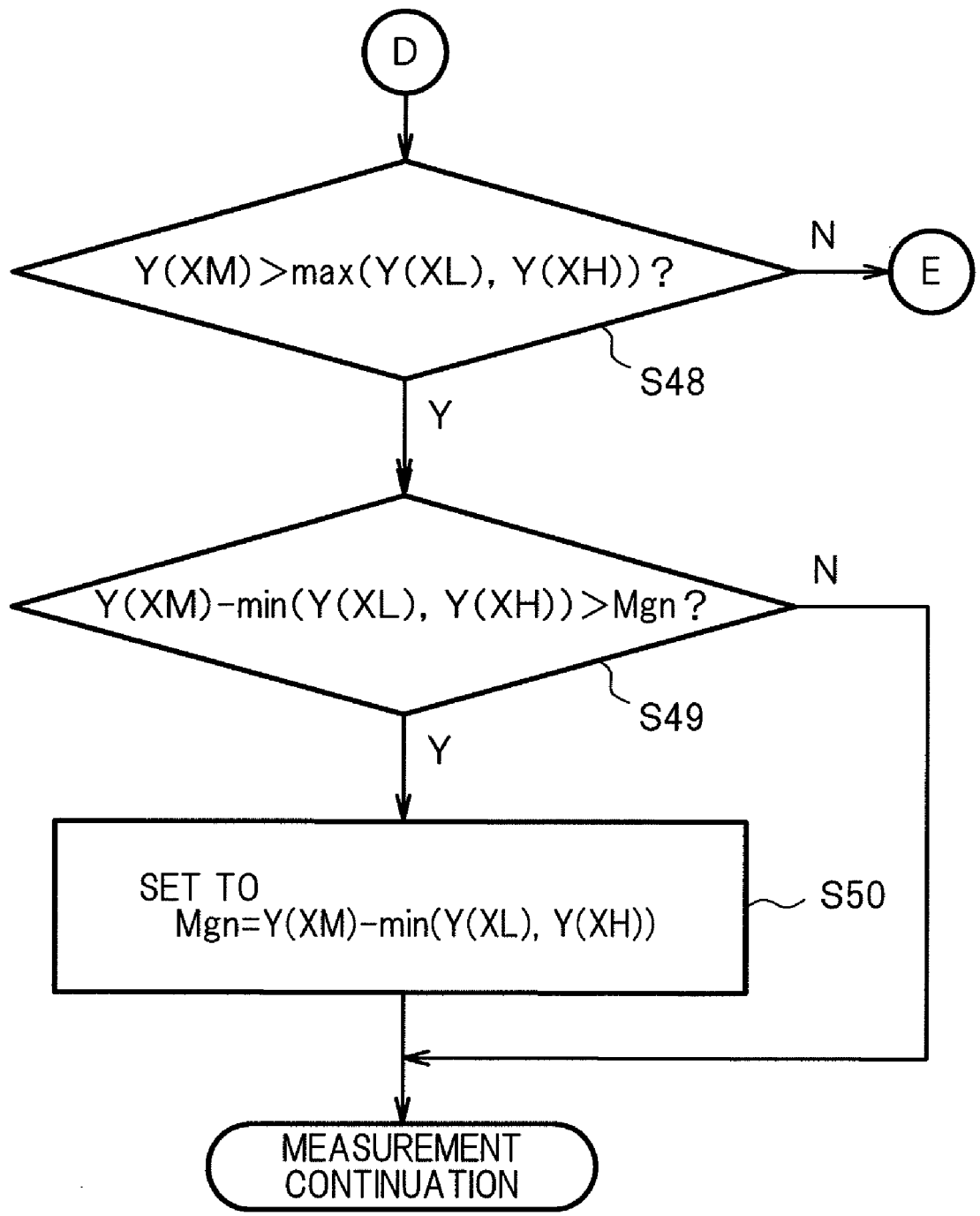
FIG. 13 is a flowchart illustrating the example of the termination judgment processing.

Next, an example of the termination judgment processing performed in Step S26 described above will be described referring to flowcharts of FIGS. 12 and 13. In the following description, the set value Xn, for which the jitter value Yn becomes minimum, other than the maximum value XH and the minimum value XL in the set values, for which the jitter values have been measured, is denoted as a set value XM.

The set value changing unit 42a first compares in magnitude the smaller one of the jitter value Y(XH) for the maximum value XH and the jitter value Y(XL) for the minimum value XL, with the jitter value Y(XM) (S41). Specifically, let the smaller one of values a and b be denoted as min(a, b). Then, it is judged whether or not a conditional expression:

$$Y(XM) < \min(Y(XL), Y(XH))$$

is established. When the conditional expression is established, the three sample data items corresponding to the set values XL, XM, and XH have a concave upward relation.

When it is judged that the conditional expression of Step S41 is satisfied, the set value changing unit 42a further judges whether or not a difference between min(Y(XL), Y(XH)) and Y(XM) is larger than a predetermined margin value Mgn (S42). Specifically, the set value changing unit 42a judges whether or not a conditional expression:

$$\min(Y(XL), Y(XH)) - Y(XM) > Mgn$$

is established. When the conditional expression is satisfied, each of the jitter values on both sides of the range of the set values, for which the jitter values have been successfully measured, is larger than the minimum value Y(XM) of the measured jitter values by the predetermined margin value Mgn or larger. In this case, it is judged that at least the combinations of the three set values XL, XM, and XH and the corresponding jitter values satisfy the condition as the sample data items which can be approximated by the least squared method. It is therefore judged that the measurement is terminated to terminate the termination judgment processing.

On the other hand, when it is judged that the conditional expression of Step S42 is not satisfied, the set value changing unit 42a judges whether or not the measurement is to be further continued by a procedure described below. Specifically, the set value changing unit 42a first judges whether or not the measurement of the jitter value has already failed for the set value smaller than the minimum value XL of the set values, for which the jitter values are acquired currently (S43). If the measurement of the jitter value has failed, the set value changing unit 42a judges whether or not the measurement of the jitter value has already failed for the set value larger than the minimum value XH of the set values, for which the jitter values are acquired currently (S44). When it is judged even in Step S44 that the measurement of the jitter value has failed, it means that the measurement of the jitter value has failed on both sides of the range of the set values, for which the measurement has already been performed. Therefore, it is judged that the measurement termination condition is satisfied and the measurement is not to be further performed. The termination judgment processing is then terminated.

When it is judged in Step S44 that the measurement of the jitter value has not failed on the maximum value XH side, the set value changing unit 42a judges whether or not a difference between Y(XH) and Y(XM) exceeds the margin value Mgn (S45). Specifically, it is judged whether or not a conditional expression:

$$Y(XH)-Y(XM)>Mgn$$

is satisfied. When the conditional expression is satisfied, it is considered that it is no longer necessary to measure the jitter value with the set value larger than the maximum value XH. On the other hand, since it is judged in Step S43 that the measurement of the jitter value has failed for the set value smaller than the minimum value XL, the measurement is not to be performed any more. Then, it is judged that the measurement termination condition is satisfied to terminate the termination judgment processing. Conversely, when it is judged that the conditional expression of Step S45 is not satisfied, it is desirable to further continue the measurement of the jitter value with the set value larger than the maximum value XH. Therefore, it is judged that the measurement termination condition is not satisfied (that is, the measurement is to be continued) to terminate the termination judgment processing.

When it is judged in Step S43 that the measurement of the jitter value has not failed, the set value changing unit 42a further judges whether or not the measurement of the jitter value has failed for the set value larger than the maximum value XH as in Step S44 (S46). When it is judged that the measurement has not failed, the measurement has not failed on either side of the range of the set values, for which the measurement is terminated. Therefore, the measurement is to be continued. Accordingly, it is judged that the measurement termination condition is not satisfied. Then, the termination judgment processing is terminated.

On the other hand, when it is judged in Step S46 that the measurement of the jitter value has failed on the maximum value XH side, the set value changing unit 42a judges whether or not a difference between Y(XL) and Y(XM) exceeds the margin value Mgn (S47). Specifically, it is judged whether or not a conditional expression:

$$Y(XL)-Y(XM)>Mgn$$

is satisfied. When the conditional expression is satisfied, similarly to the case of Step S45, it is considered that it is no longer necessary to measure the jitter value with the set value smaller than the minimum value XL. Therefore, the measurement is not to be performed any more. It is then judged that the measurement termination condition is satisfied to terminate the termination judgment processing. Conversely, when it is judged that the conditional expression of Step S47 is not satisfied, it is necessary to further continue the measurement of the jitter value with the set value smaller than the minimum value XL. It is therefore judged that the measurement termination condition is not satisfied to terminate the termination judgment processing.

When it is judged that the conditional expression of Step S41 is not satisfied, the set value changing unit 42a compares in magnitude the larger one of Y(XH) and Y(XL) with Y(XM) this time (S48). Specifically, let the larger one of the values a and b be denoted by max(a, b). It is then judged whether or not a conditional expression:

$$Y(XM)>\max(Y(XL), Y(XH))$$

is established. When the conditional expression is established, three sample data items respectively corresponding to the set values XL, XM, and XH have a concave downward relation.

When it is judged that the conditional expression of Step S48 is satisfied, it is considered that the value of Y(XM) has become abnormal due to a measurement error or the like. It is therefore necessary to further continue the measurement. Prior to the continuation of the measurement, however, it is judged whether or not the margin value Mgn needs to be changed. Specifically, the set value changing unit 42a judges whether or not a difference between Y(XM) and min(Y(XL), Y(XH)) is larger than the predetermined margin value Mgn (S49). Specifically, the set value changing unit 42a judges whether or not a conditional expression:

$$Y(XM)-\min(Y(XL), Y(XH))>Mgn$$

is established. When the conditional expression is satisfied, there is a possibility that, even if the measurement is continued and the jitter value, which is larger than the current value of min(Y(XL), Y(XH)) by the margin value Mgn or more, is measured for the maximum value XH and the minimum value XL of the new set values, the new measured jitter value may be smaller than Y(XM) that is the abnormal value. Therefore, for performing the approximation by the least square method with good accuracy, the margin value Mgn is increased. Specifically, the set value changing unit 42a sets the margin value to a new value as expressed by:

$$Mgn=Y(XM)-\min(Y(XL), Y(XH))$$

(S50). When it is judged that the conditional expression of Step S48 is satisfied, the measurement needs to be continued regardless of the result of judgment in subsequent Step S49. It is therefore judged that the measurement termination condition is not satisfied, and the termination judgment processing is terminated.

On the other hand, when it is judged that the conditional expression of Step S48 is not satisfied, the three sample data items corresponding to the set values XL, XM, and XH have a monotonically increasing or monotonically decreasing relation. In this case, as in the case where it is judged that the conditional expression of Step S42 is not satisfied, the processing proceeds to Step S43 where the set value changing unit 42a judges whether or not the measurement is to be continued according to the presence or absence of a point at which the measurement is impossible.

The constants used in the above-mentioned processing, such as the initial value X0, the step amount d, and the margin value Mgn may be stored in a memory area such as an EEPROM which can retain data even after the optical disc device 1 is powered OFF. In this manner, if the values need to be revised later, the values can be rewritten to new values.

According to this embodiment described above, when three or more sample data items are acquired to calculate the adjusted value, the set value to be set next is determined according to two or more evaluation values which are already obtained by the measurement of the evaluation values. As a result, the sample data items required for the approximate calculation can be efficiently acquired, resulting in the parameter adjustment in a short period of time.

Though the jitter value is used as the evaluation value in the above-mentioned description, other evaluation values such as an amplitude value of the RF signal may be used, for example. When the evaluation value, which indicates better accuracy of reading the information from the optical disc medium as increasing as in the case of the amplitude value of the RF signal, is used, the relation between the set value and the evaluation value is represented by, for example, a concave downward parabola. Even in this case, the adjusted value can be calculated by the same processing as that described above except that the criteria for judging the magnitude relation of the evaluation values is inverted. Moreover, the control parameter to be adjusted is not limited to the parameter for the position of the collimator lens 33, but may also be various parameters such as a focus bias parameter corresponding to a parameter regarding an offset value for adjusting the distance from the objective lens 36 to the surface of the optical disc medium.

[Parameter Adjustment Operation for a Plurality of Control Parameters]

Next, control realized by the optical disc apparatus according to this embodiment when the parameter adjustment operation is performed collectively for a plurality of control parameters will be described. In the following example, the optical disc apparatus 1 performs the parameter adjustment operation to calculate the adjusted values to be set for performing the servo control respectively for a plurality of control parameters.

Hereinafter, the example where the two control parameters, i.e., the parameter for the position of the collimator lens 33 (SA parameter) and the focus bias parameter regarding the offset value of the distance from the objective lens 36 to the surface of the optical disc medium (hereinafter, referred to as an FB parameter) are collectively adjusted is described as an example of the adjustment of the plurality of control parameters. The collimator lens driving unit 34 changes the position of the collimator lens 33 according to the adjusted SA parameter to thereby realize the correction of the spherical aberration of the objective lens 36. Moreover, the offset of the FE signal is adjusted according to the adjusted FB parameter to thereby correct a positional deviation in a direction vertical to the surface of the optical disc medium between the position of the objective lens 36, at which the focus of the objective lens 36 is on the signal surface, and the position of the objective lens 36 in the state where a reference value of the FE signal is output. The adjustments described above enable the optical pickup 13 to read the information from the optical disc medium M with good accuracy.

Hereinafter, processing performed by the control unit 20 of the optical disc apparatus 1 according to this embodiment for performing the parameter adjustment operation for the plurality of control parameters is described. The processing described below is realized in the form of software by the execution of the program stored in the storage element included in the control unit 20 by the control unit 20.

The control unit 20 first changes the set values of the SA parameter and the FB parameter to target values determined according to a given rule, and outputs a control signal for driving the three-axis actuator 14 according to the target values to the servo signal processing unit 18. In this manner, the control unit 20 changes the position of the collimator lens 33 and the position of the objective lens 36. This processing is referred to as set value change processing below. Then, each time the set value change processing is completed, the control unit 20 judges whether or not a signal for notifying the occurrence of the servo error has been output from the servo signal processing unit 18. When the servo error occurs, the control unit 20 performs the servo set processing (focus detection processing in this case) again to cause the servo signal processing unit 18 to start performing the servo control again.

In the state where the set value change processing is completed and the servo control is being performed by the servo signal processing unit 18, the control unit 20 acquires the evaluation value (jitter value) measured by the recorded signal processing unit 19 based on the RF signal from the recorded signal processing unit 19. As a result, the combination of a set of the given target values of the SA parameter and the FB parameter, which are changed by the set value change processing, and the jitter value which is measured with the parameters being set to the respective target values, is acquired as the sample data item.

The control unit 20 repeats the set value change processing several times to acquire a plurality of sample data items. Then, the control unit 20 performs predetermined computation processing on the thus obtained plurality of sample data items to calculate the respective adjusted values of the SA parameter and the FB parameter, which can reduce the jitter value. The control unit 20 outputs each of the thus calculated adjusted values to the servo signal processing unit 18 to adjust the position of the collimator lens 33 and the position of the objective lens 36 according to the adjusted values. The set value change processing may be the same as that to be performed by the set value changing unit 42*a* for performing the parameter adjustment operation for a single control parameter. Specifically, when the control unit 20 further performs the set value change processing after acquiring two or more sample data items, the control unit 20 may determine the target values to be set next respectively for the SA parameter and the FB parameter according to the magnitude of the jitter values in the sample data items obtained by then.

Hereinafter, the details of the set value change processing performed by the control unit 20, which changes the value of each of the parameters to the given target value, are described. In the following description, the set values (initial values) of the SA parameter and the FB parameter at the start of the set value change processing are denoted respectively by Xa and Ya, and the target values of the SA parameter and the FB parameter are denoted respectively by Xb and Yb. Total change amounts for changing the values of the parameters to the given target values are respectively denoted by $\Delta x$ and $\Delta y$. That is, $Xb = Xa + \Delta x$; and $Yb = Ya + \Delta y$ are established. In this embodiment, the target value Xb is set to a value obtained by adding an integral multiple of a predetermined unit change amount (step amount) dx to the initial value Xa. In the same manner, the target value Yb is set to a value obtained by adding an integral multiple of a predetermined unit change amount (step amount) dy to the initial value Ya. Specifically, let n be an arbitrary integer. Then, $$\Delta x = n \cdot dx;\text{ and}$$

$$\Delta y = n \cdot dy$$

are established, where may be any of a positive value and a negative value.

In this embodiment, the control unit 20 changes the value of the control parameter several times when the total change amount of the control parameter to the target value exceeds a predetermined reference amount for at least one control parameter of the plurality of control parameters. The other parameter(s) is(are) changed between the plurality of times of changing the control parameter. Specifically, instead of first changing the SA parameter by the total change amount Δx at one time, and then changing the FB parameter by the total change amount Δy at one time to change the SA parameter and the FB parameter to the given target values Xb and Yb, the set value is changed in a stepwise manner in two or more steps for the parameter, for which the total change amount exceeds the given reference amount. In this case, a step of changing the value of the SA parameter and a step of changing the value of the FB parameter are alternately repeated to change each of the parameters to its given target value.

In this case, the control unit 20 may divide the total change amount into predetermined step change amounts as units to change the control parameter by the step change amount for each time. Specifically, the step change amount indicates a unit amount for changing the corresponding control parameter in one step. The step change amount may be determined according to the predetermined reference amount. As an example, when the unit change amounts dx and dy are reference amounts and the total change amounts 66 x and Δy respectively exceed the unit change amounts dx and dy, each of the parameters is respectively changed by dx or dy in one step.

Figure 14:
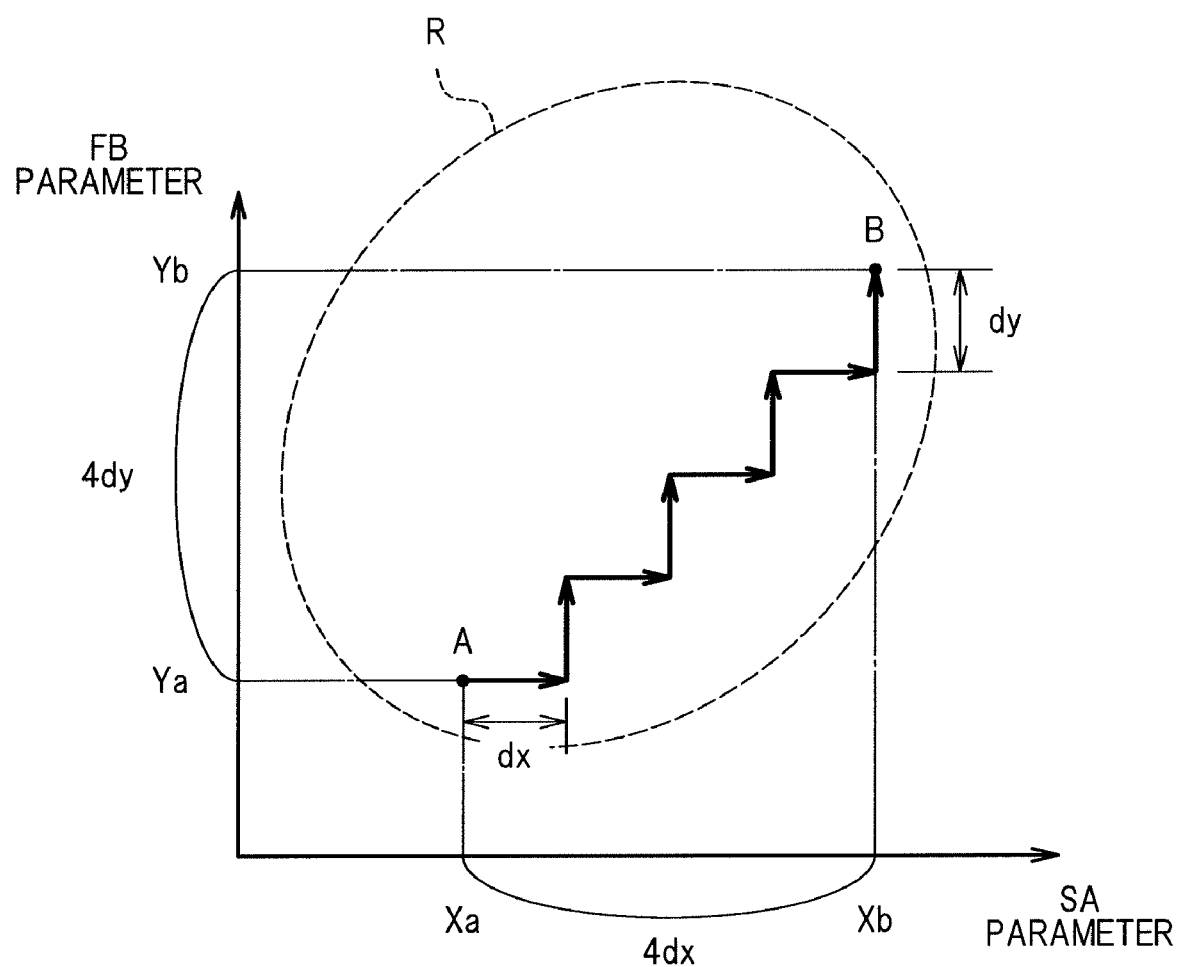
FIG. 14 is an explanatory graph showing an example of a process of changing a combination of values of control parameters.
Figure 20:
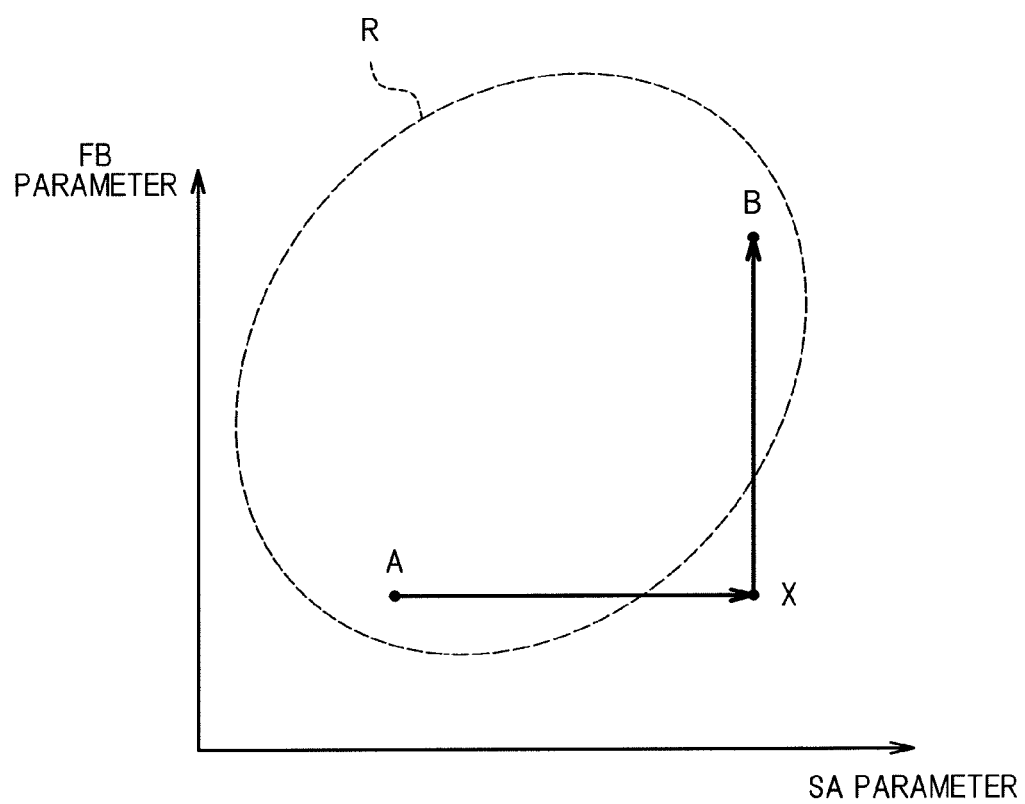
FIG. 20 is an explanatory graph showing an example of the process of changing the combination of the values of the control parameters in an optical disc apparatus of a related art.

FIG. 14 is a graph showing an example of a process of change of each of the parameters when the above-mentioned control is performed. In an example illustrated in FIG. 14, an abscissa axis represents the SA parameter, whereas an ordinate axis represents the FB parameter as in the case of FIG. 20. The positions of the point A representing the combination of the respective initial values of the parameters at the start of the set value change processing, the point B representing the combination of the respective target values of the parameters, and the servo normal operation range R are the same as those of FIG. 20. The total change amount Δx for the SA parameter from the point A to the point B is 4dx, whereas the total change amount Δy for the FB parameter from the point A to the point B is 4dy. In the example illustrated in FIG. 14, with the set value change processing performed by the control unit 20, the SA parameter first changes by dx, and after the position of the collimator lens 33 moves according to the change of the value of the SA parameter, the value of the FB parameter is changed by dy. Then, according to the change of the value of the FB parameter, the position of the objective lens 36 moves. The above-mentioned operation is repeated four times. Ultimately, the set value of the SA parameter is changed to the target value Xb, whereas the set value of the FB parameter is changed to the target value Yb. As a result, the combination of the values of the two parameters is prevented from getting out of the servo normal operation range R during the process of the set value change processing. Therefore, in contrast to the case illustrated in FIG. 20, the servo error does not occur.

As described above, for the control parameter, for which the total change amount to the target value exceeds the predetermined reference amount, the process of changing the value of the control parameter is divided into a plurality of steps, and the change of the value of one parameter and the change of the value of the other parameter are alternately performed for each step change amount. As a result, a path indicating the process of change of the parameters in a space having the plurality of parameters as reference axes becomes closer to a straight line which connects the point A representing the combination of the respective initial values of the parameters and the point B representing the combination of the respective target values of the parameters. As a result, the possibility of occurrence of a state where the combination of the values of the parameters is not within the servo normal operation range R (that is, servo error state) is reduced in the process of changing the values of the parameters to their target values.

Though the reference amount serving as the criterion for judging whether or not the change of each of the parameters is to be performed in a plurality of steps and the step change amount for changing the value of the parameter in each of the steps are equal to the unit change amount in the example described above, the reference amount and the step change amount may be larger than the unit change amount. If the step change amount in each of the steps is reduced for the SA parameter, in particular, the number of steps obtained by dividing the total change amount is correspondingly increased. As a result, the collimator lens driving unit 34 repeats the control for driving the collimator lens 33 by an extremely small distance several times. When the collimator lens driving unit 34 includes, for example, a stepping motor, the collimator lens driving unit 34 takes a long time to change the position of the collimator lens 33 in one step due to the effects of initiating excitation and an extended period of time of excitation. Therefore, when the number of steps increases, the time required for the set value change processing also increases. Thus, the step change amount is increased under the condition where the servo error is unlikely to occur. As a result, the time required for the set value change processing can be reduced.

Figure 15:
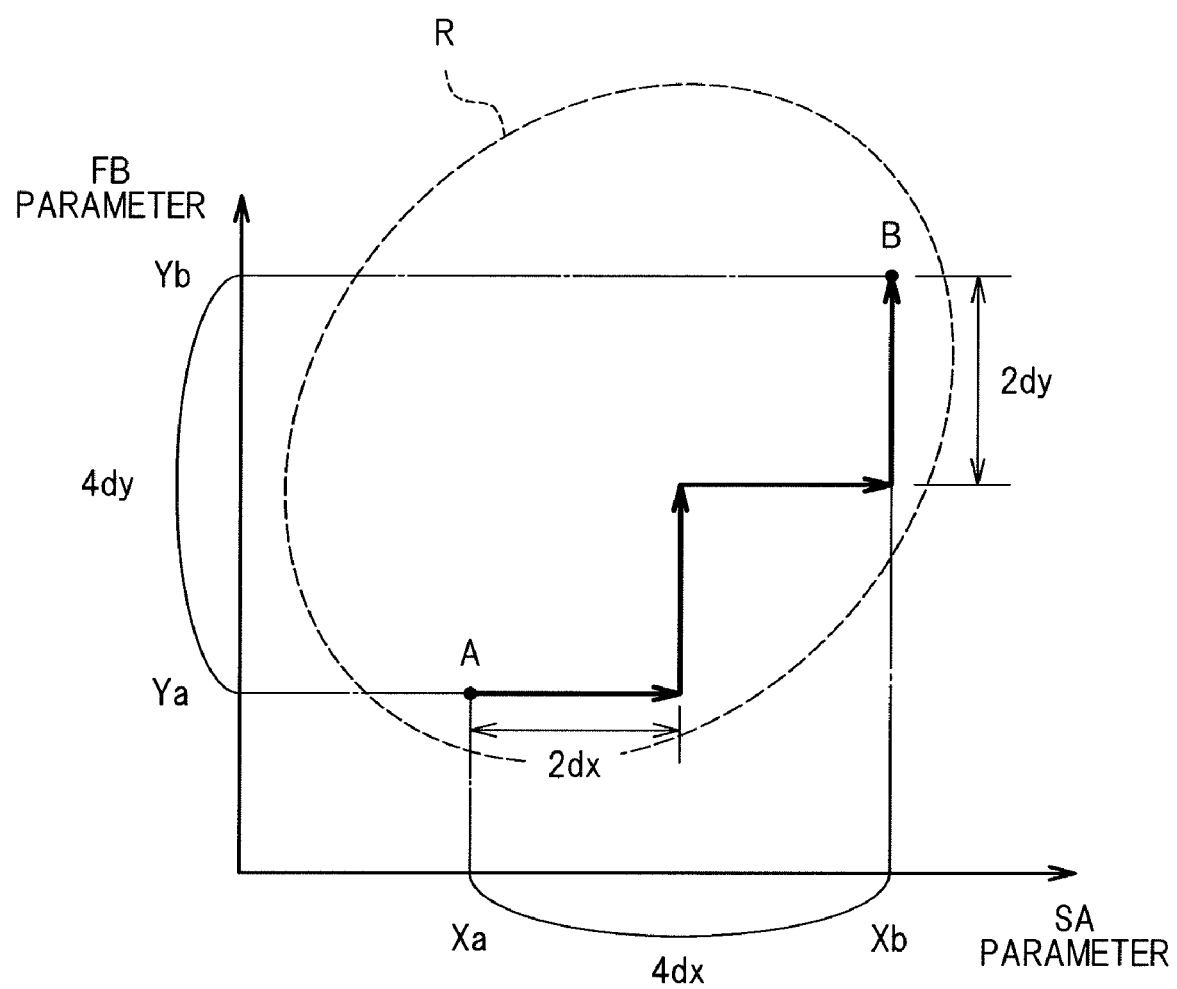
FIG. 15 is an explanatory graph showing another example of the process of changing the combination of the values of the control parameters.

As described above, it is desirable to set the step change amount to a value that is as large as possible within the range where the servo error is unlikely to occur according to the size and the shape of the servo normal operation range R. As a specific example, when the servo normal operation range R is ellipsoidal as illustrated in FIG. 14, the step change amounts of the SA parameter and the FB parameter are determined according to diameters of a major axis and a minor axis of the ellipsoid, and a tilt of the major axis or the minor axis with respect to the X-axis. FIG. 15 illustrates an example of the process of changing the SA parameter and the FB parameters when the reference amount and the step change amount of the SA parameter are 2dx, and the reference amount and the step change amount of the FB parameter are 2dy. Even in the example illustrated in FIG. 15, the combination of the values of the parameters changes within the servo normal operation range R.

In each of the examples illustrated in FIGS. 14 and 15, a ratio of the reference amount or the step change amount to the unit change amount is the same for the two parameters. Specifically, in FIG. 15, for example, the reference amount or the step change amount is twice as large as the unit change amount for each of the SA parameter and the FB parameter. However, the ratio of the reference amount or the step change amount to the unit change amount may differ for each control parameter.

FIG. 16 illustrates an example where the parameters are respectively changed by the step change amounts, each having a different ratio to the unit change amount. In the example illustrated in FIG. 16, for the total amounts Δx=4dx and Δy=4dy, the step change amount of the SA parameter is set to 4dx, whereas the step change amount of the FB parameter is set to 2dy. As a result, for the SA parameter, the set value is changed by the total change amount in one step. On the other hand, for the FB parameter, the set value is changed by the total change amount in two steps. Even in the example illustrated in FIG. 16, the combination of the values of the parameters changes from the point A to the point B within the servo normal operation range R. Moreover, since the number of steps required for changing the set value of the SA parameter by the total change amount is one, the number of times of changing the position of the collimator lens 33 is smaller than that in the examples illustrated in FIGS. 14 and 15.

In the example illustrated in FIG. 16, the step change amount of the FB parameter has a smaller ratio to the unit change amount than the step change amount of the SA parameter. Therefore, the number of steps is larger for the FB parameter than for the SA parameter. Thus, in contrast to the examples illustrated in FIGS. 14 and 15, in the example illustrated in FIG. 16, the value of the FB parameter is changed prior to the beginning of the change of the value of the SA parameter. As described above, the control unit 20 may select the control parameter, with which the step of changing the set value is started, according to the number of steps for each of the control parameters determined according to the step change amount of each of the control parameters.

In the examples illustrated in FIGS. 15 and 16, the step change amount for each of the control parameters becomes larger than that in the example illustrated in FIG. 14. Therefore, in comparison with the example illustrated in FIG. 14, there is a higher fear that the combination of the values of the control parameters may move out of the servo normal operation range R in the process of the set value change processing, to cause the servo error. Thus, if the servo error occurs when the set value change processing is performed by using the step change amount larger than the unit change amount as illustrated in FIGS. 15 and 16, the control unit 20 may modify the step change amount to a smaller value for the next and subsequent set value change processing.

Figure 17A:
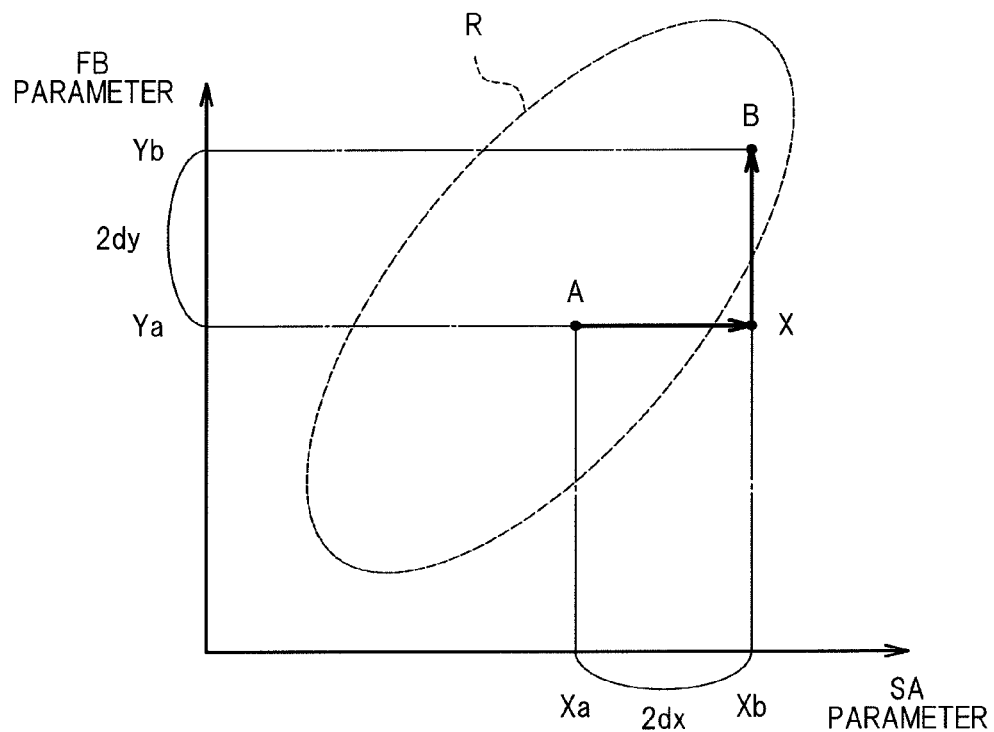
FIGS. 17A and 17B are explanatory graphs showing still another example of the process of changing the combination of the values of the control parameters.
Figure 17B:
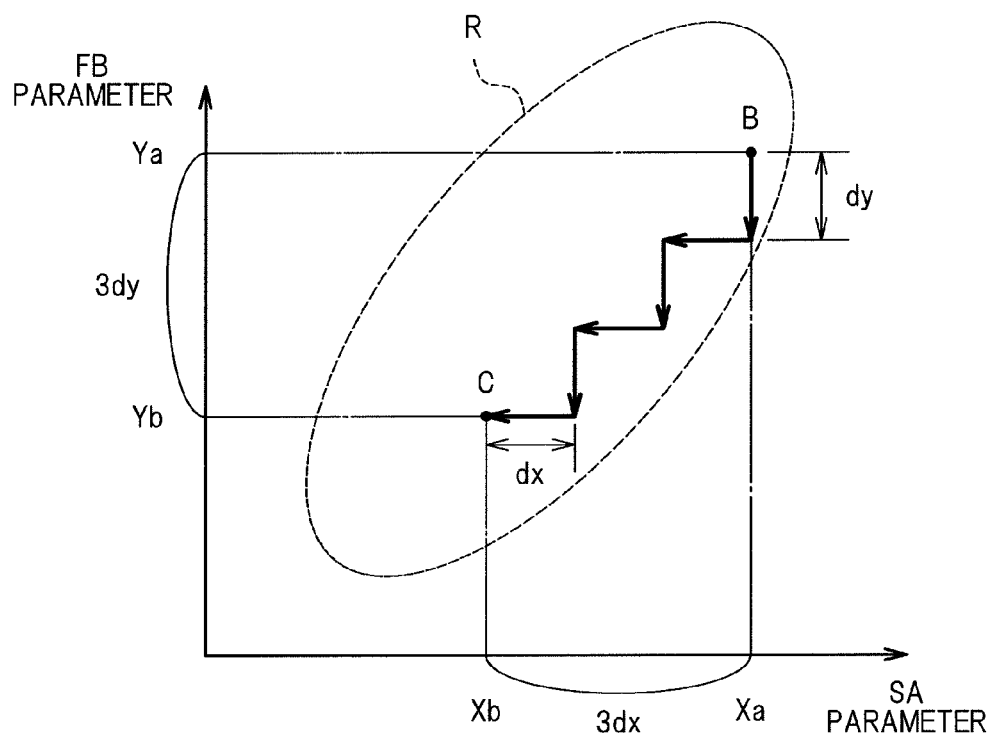

For example, FIGS. 17A and 17B illustrate an example of the modification of the step change amount when the servo error undesirably occurs in the set value change processing with the step change amount 2dx for the SA parameter and the step change amount 2dy for the FB parameter as exemplified in FIG. 15. Though the set value change processing is performed in FIG. 17A with the same step change amount as that in the case illustrated in FIG. 15, the servo error occurs at the position indicated by a point X, unlike the example of FIG. 15. Therefore, for changing the respective set values of the control parameters from the point B to a point C in the next set value change processing, the control unit 20 modifies the respective step change amounts of the control parameter to dx and dy, each corresponding to a half value of the step change amount used in the previous set value change processing, as exemplified in FIG. 17B. As a result, for example, when the set value change processing from the point A to the point B is followed by the second set value change processing in the same path, but in the reverse direction, the servo error can be prevented from occurring in the second set value change processing even if the servo error occurs in the first set value change processing.

Figure 18A:
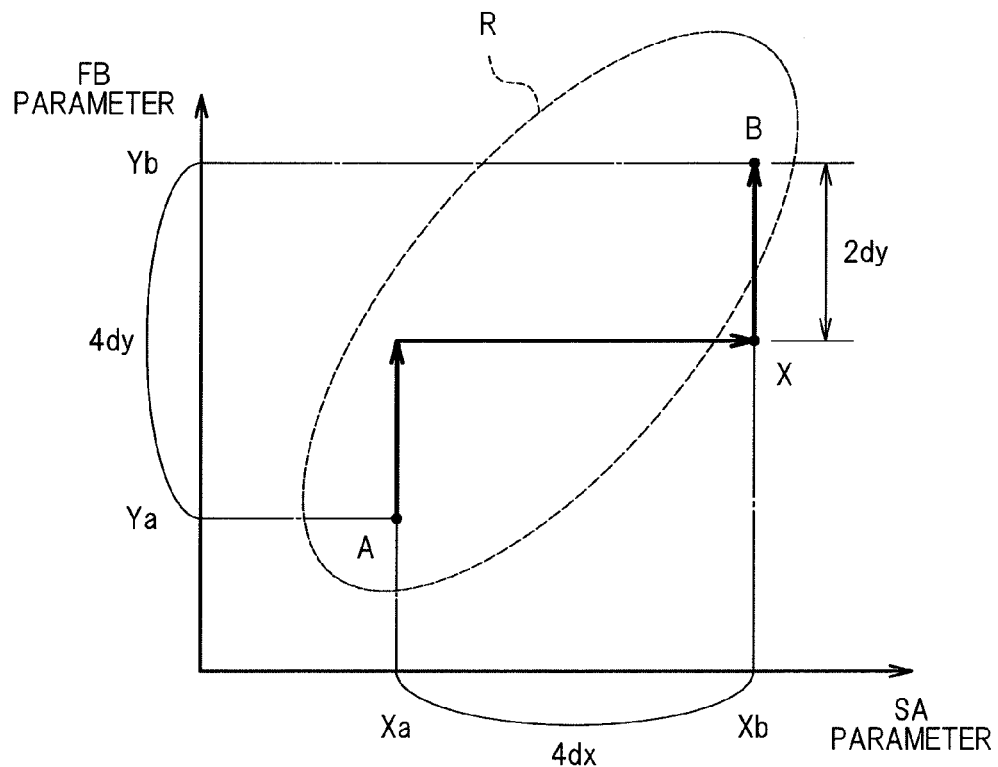
FIGS. 18A and 18B are explanatory graphs showing still another example of the process of changing the combination of the values of the control parameters.
Figure 18B:
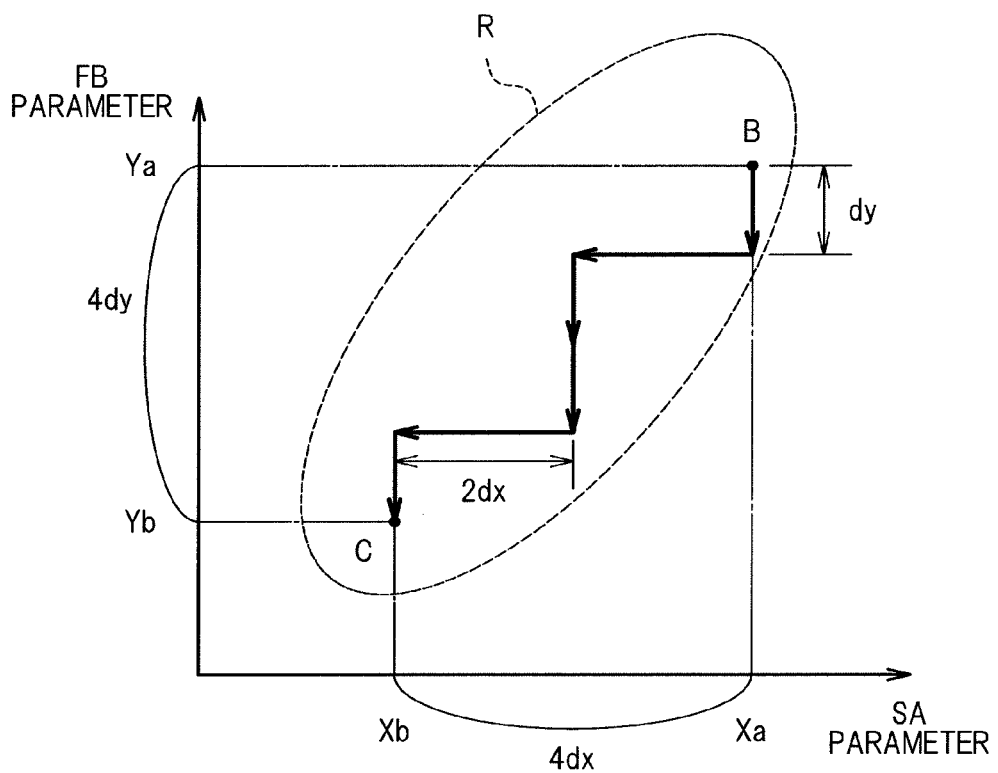
Figure 19:
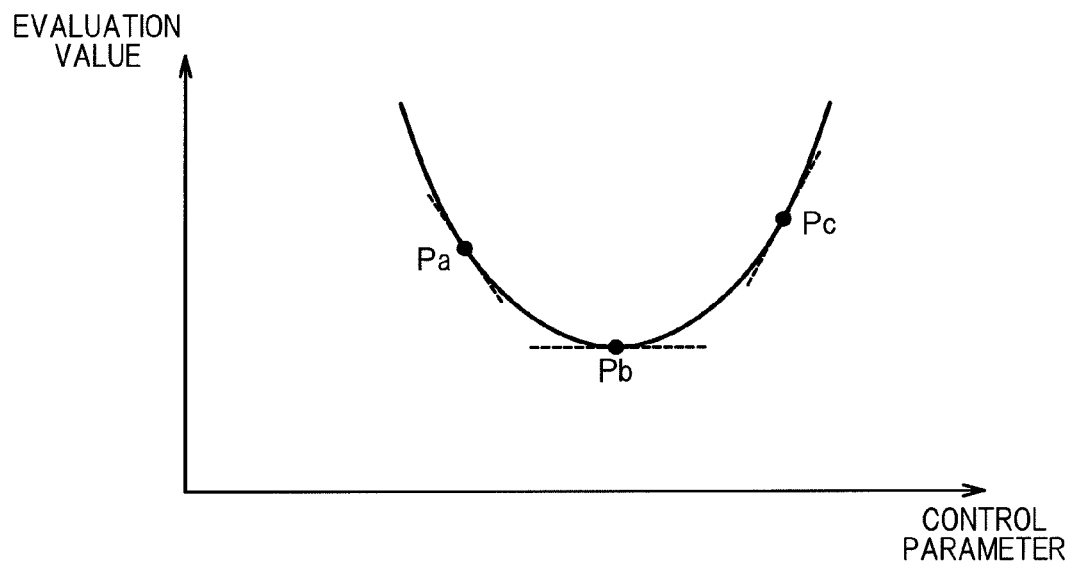
FIG. 19 is a graph showing an example of a relation between the set value of the parameter and the evaluation value.

Similarly, FIGS. 18A and 18B illustrates an example of the modification of the step change amount when the servo error occurs in the set value change processing with the step change amount 4dx for the SA parameter and the step change amount 2dy for the FB parameter as exemplified in FIG. 16. Even in FIG. 18A, the servo error occurs at the position indicated by the point X. Therefore, after the step change amount of each of the control parameters is halved as in the case of FIG. 17B, the next set value change processing as illustrated in FIG. 18B is performed. As a result, the control unit 20 can perform the set value change processing in the next and subsequent set value change processing in a mode in which the servo error hardly occurs.

In the example illustrated in FIG. 18B, the step change amount for the SA parameter becomes 2dx and the step change amount for the FB parameter becomes dy as a result of halving the step change amount of FIG. 18A. On the other hand, the total change amount Δx for the SA parameter is 4dx, whereas the total change amount Δy for the FB parameter is 4dy. Therefore, the number of steps for changing the set value of the SA parameter is two, whereas the number of steps for changing the set value of the FB parameter is four. As a result, there is a difference larger than one between the numbers of steps of the two parameters. Therefore, in contrast to the example of FIG. 16, even if the step of changing the set value is first started for the FB parameter, all the steps cannot be completed simply by alternately repeating changing of the set value of the FB parameter and that of the SA parameter. Accordingly, the step of changing the set value of the FB parameter is successively performed twice in any of the steps. In such a case, the control unit 20 performs the change of the set value in the successive steps not as the first or last setting change step in the set value change processing but in the middle of the change process, as illustrated in FIG. 18B. In this manner, there is a lower possibility that the combination of the values of the control parameters will move out of the servo normal operation range R.

According to this embodiment described above, when the plurality of control parameters are changed collectively for the adjustment of the parameters, the change of the value of at least one of the control parameters is performed in a plurality of steps alternately with the change of the other parameter(s). As a result, the combination of the values of the control parameters hardly ever moves out of the servo normal operation range R, thereby reducing the occurrence of the servo error.

The embodiment of the present invention is not limited to that described above. For example, though the jitter value is used as the evaluation value in the above-mentioned description, other evaluation values such as the amplitude value of the RF signal can also be used. Moreover, even for the control parameters, the control as described above may be performed when various parameters other than the SA parameter and the FB parameter described above are collectively adjusted.

While there have been described what are at present considered to be certain embodiments of the invention, it is understood that various modifications may be made thereto, and it is intended that the appended claims cover all such modifications as fall within the true spirit and scope of the invention.

What is claimed is:
1. An optical disc apparatus for reading information recorded on an optical disc medium, comprising:
   an optical pickup for outputting an output signal according to the information recorded on the optical disc medium;
   a servo implementation unit for controlling a relative position of the optical pickup with respect to a surface of the optical disc medium according to the output signal of the optical pickup to implement servo control for maintaining a state where the information is readable from the optical disc medium;

evaluation value acquisition means for acquiring an evaluation value for information reading accuracy of the optical pickup when the servo control is implemented; and parameter adjustment means for calculating a set value of a predetermined parameter to be set for the implementation of the servo control based on the evaluation value acquired by the evaluation value acquisition means for each of at least four set values of the predetermined parameter while changing the set value of the predetermined parameter, wherein the parameter adjustment means determines the set value for a fourth measurement according to a magnitude relation between two evaluation values acquired respectively for a maximum value and a minimum value of the set values used for three previous measurements.

2. An optical disc apparatus according to claim 1, wherein the optical pickup includes an objective lens for focusing light on a signal surface of the optical disc medium and a collimator lens for changing its own position to correct spherical aberration of the objective lens, and wherein the predetermined parameter is a parameter for the position of the collimator lens.

3. A method of controlling an optical disc apparatus comprising:

an optical pickup for outputting an output signal according to information recorded on an optical disc medium; and a servo implementation unit for controlling a relative position of the optical pickup with respect to a surface of the optical disc medium according to the output signal of the optical pickup to implement servo control for maintaining a state where the information is readable from the optical disc medium, the method comprising:

an evaluation value acquisition step of acquiring an evaluation value for information reading accuracy of the optical pickup when the servo control is implemented; and a parameter adjustment step of calculating a set value of a predetermined parameter to be set for the implementation of the servo control based on the evaluation value acquired in the evaluation value acquisition step for each of at least four set values of the predetermined parameter while changing the set value of the predetermined parameter, wherein the parameter adjustment step comprises determining the set value for a fourth measurement according to a magnitude relation between two evaluation values acquired respectively for a maximum value and a minimum value of the set values used for three previous measurements.

4. A computer readable information storage medium storing a program for controlling an optical disc apparatus comprising:

an optical pickup for outputting an output signal according to information recorded on an optical disc medium; and a servo implementation unit for controlling a relative position of the optical pickup with respect to a surface of the optical disc medium according to the output signal of the optical pickup to implement servo control for maintaining a state where the information is readable from the optical disc medium, the program controlling a computer to function as:

evaluation value acquisition means for acquiring an evaluation value for information reading accuracy of the optical pickup when the servo control is implemented; and parameter adjustment means for calculating a set value of a predetermined parameter to be set for the implementation of the servo control based on the evaluation value acquired by the evaluation value acquisition means for each of at least four set values of the predetermined parameter while changing the set value of the predetermined parameter, wherein the parameter adjustment means determines the set value for a fourth measurement according to a magnitude relation between two evaluation values acquired respectively for a maximum value and a minimum value of the set values used for three previous measurement.

5. An optical disc apparatus for reading information recorded on an optical disc medium, comprising:

an optical pickup for outputting an output signal according to the information recorded on the optical disc medium;

a servo implementation unit for controlling a relative position of the optical pickup with respect to a surface of the optical disc medium according to the output signal of the optical pickup to implement servo control for maintaining a state where the information is readable from the optical disc medium; and parameter adjustment means for changing a value of each of a plurality of parameters set for the servo control to a given target value when the servo control is implemented, wherein the parameter adjustment means performs the change of the value of at least one of the plurality of parameters to the target value a plurality of times, and changes another parameter between the plurality of times of changing the at least one parameter; and wherein the parameter adjustment means performs the change of the value of the at least one of the plurality of parameters a plurality of times when an amount of the change of the at least one of the plurality of parameters to the target value exceeds a predetermined reference amount.

6. A method of controlling an optical disc apparatus comprising:

an optical pickup for outputting an output signal according to information recorded on an optical disc medium; and a servo implementation unit for controlling a relative position of the optical pickup with respect to a surface of the optical disc medium according to the output signal of the optical pickup to implement servo control for maintaining a state where the information is readable from the optical disc medium, the method comprising:

changing a value of each of a plurality of parameters set for the servo control to a given target value during the implementation of the servo control, wherein the changing comprises performing the change of the value of at least one of the plurality of parameters to the target value a plurality of times, and changing another parameter between the plurality of times of changing the at least one parameter, and wherein the change of the value of the at least one of the plurality of parameters is performed a plurality of times when an amount of the change of the at least one of the plurality of parameters to the target value exceeds a predetermined reference amount.

7. A computer readable information storage medium storing a program for controlling an optical disc apparatus comprising:

an optical pickup for outputting an output signal according to information recorded on an optical disc medium; and a servo implementation unit for controlling a relative position of the optical pickup with respect to a surface of the optical disc medium according to the output signal of the optical pickup to implement servo control for maintaining a state where the information is readable from the optical disc medium, the program controlling a computer to function as parameter adjustment means for changing a value of each of a plurality of parameters set for the servo control to a given target value during the implementation of the servo control, wherein the parameter adjustment means performs the change of the value of at least one of the plurality of parameters to the target value a plurality of times, and changes another parameter between the plurality of times of changing the at least one parameter, and wherein the parameter adjustment means performs the change of the value of the at least one of the plurality of parameters a plurality of times when an amount of the change of the at least one of the plurality of parameters to the target value exceeds a predetermined reference amount.

8. An optical disc apparatus for reading information recorded on an optical disc medium, comprising:

an optical pickup for outputting an output signal according to the information recorded on the optical disc medium, wherein the optical pickup includes an objective lens for focusing light on a signal surface of the optical disc medium;

a servo implementation unit for controlling a relative position of the optical pickup with respect to a surface of the optical disc medium according to the output signal of the optical pickup to implement servo control for maintaining a state where the information is readable from the optical disc medium;

evaluation value acquisition means for acquiring an evaluation value for information reading accuracy of the optical pickup when the servo control is implemented; and parameter adjustment means for calculating a set value of a predetermined parameter to be set for the implementation of the servo control based on the evaluation value acquired by the evaluation value acquisition means for each of at least three set values of the predetermined parameter while changing the set value of the predetermined parameter, wherein the predetermined parameter is a parameter regarding an offset value for a distance between the objective lens and the surface of the optical disc medium, and wherein the parameter adjustment means determines the set value to be set for further acquiring the evaluation value according to the evaluation values acquired for at least two set values of the predetermined parameter.

9. An optical disc apparatus according to claim 8, wherein the parameter adjustment means determines to make the set value set for further acquiring the evaluation value one of larger than a maximum value and smaller than a minimum value of the at least two set values of the predetermined parameter according to a magnitude relation between two evaluation values acquired respectively for the maximum value and the minimum value.

10. A method of controlling an optical disc apparatus comprising:

an optical pickup for outputting an output signal according to information recorded on an optical disc medium, wherein the optical pickup includes an objective lens for focusing light on a signal surface of the optical disc medium; and a servo implementation unit for controlling a relative position of the optical pickup with respect to a surface of the optical disc medium according to the output signal of the optical pickup to implement servo control for maintaining a state where the information is readable from the optical disc medium, the method comprising:

acquiring an evaluation value for information reading accuracy of the optical pickup when the servo control is implemented; and calculating a set value of a predetermined parameter to be set for the implementation of the servo control based on the evaluation value acquired for each of at least three set values of the predetermined parameter while changing the set value of the predetermined parameter, wherein the predetermined parameter is a parameter regarding an offset value for a distance between the objective lens and the surface of the optical disc medium, and wherein the calculating and changing step comprises determining the set value to be set for further acquiring the evaluation value according to the evaluation values acquired for at least two set values of the predetermined parameter.

11. A computer readable information storage medium storing a program for controlling an optical disc apparatus comprising:

an optical pickup for outputting an output signal according to information recorded on an optical disc medium, wherein the optical pickup includes an objective lens for focusing light on a signal surface of the optical disc medium; and a servo implementation unit for controlling a relative position of the optical pickup with respect to a surface of the optical disc medium according to the output signal of the optical pickup to implement servo control for maintaining a state where the information is readable from the optical disc medium, the program controlling a computer to function as:

evaluation value acquisition means for acquiring an evaluation value for information reading accuracy of the optical pickup when the servo control is implemented; and parameter adjustment means for calculating a set value of a predetermined parameter to be set for the implementation of the servo control based on the evaluation value acquired by the evaluation value acquisition means for each of at least three set values of the predetermined parameter while changing the set value of the predetermined parameter, wherein the predetermined parameter is a parameter regarding an offset value for a distance between the objective lens and the surface of the optical disc medium, and wherein the parameter adjustment means determines the set value to be set for further acquiring the evaluation value according to the evaluation values acquired for at least two set values of the predetermined parameter.

12. An optical disc apparatus for reading information recorded on an optical disc medium, comprising:

an optical pickup for outputting an output signal according to the information recorded on the optical disc medium;

a servo implementation unit for controlling a relative position of the optical pickup with respect to a surface of the optical disc medium according to the output signal of the optical pickup to implement servo control for maintaining a state where the information is readable from the optical disc medium; and parameter adjustment means for changing a value of each of a plurality of parameters set for the servo control to a given target value when the servo control is implemented, wherein the parameter adjustment means performs the change of the value of at least one of the plurality of parameters to the target value a plurality of times, and changes another parameter between the plurality of times of changing the at least one parameter, and wherein the parameter adjustment means divides an amount of the change of the at least one of the plurality of parameters to the target value in predetermined step change amounts as units, and changes the value of the at least one of the plurality of parameters by each of the predetermined step change amounts each time.

13. An optical disc apparatus according to claim 12, wherein, when an error occurs in the servo control in a process of changing the value of each of the plurality of parameters to the target value, the parameter adjustment means changes the value of each of the plurality of parameters after the predetermined step change amounts are reduced, for changing the value of each of the plurality of parameters the next time.

14. A method of controlling an optical disc apparatus comprising:

an optical pickup for outputting an output signal according to information recorded on an optical disc medium; and a servo implementation unit for controlling a relative position of the optical pickup with respect to a surface of the optical disc medium according to the output signal of the optical pickup to implement servo control for maintaining a state where the information is readable from the optical disc medium, the method comprising:

changing a value of each of a plurality of parameters set for the servo control to a given target value when the servo control is implemented, changing of the value of at least one of the plurality of parameters to the target value a plurality of times, changing another parameter between the plurality of times of changing the at least one parameter, dividing an amount of the change of the at least one of the plurality of parameters to the target value in predetermined step change amounts as units, and changing the value of the at least one of the plurality of parameters by each of the predetermined step change amounts each time.

15. A computer readable information storage medium storing a program for controlling an optical disc apparatus comprising:

an optical pickup for outputting an output signal according to information recorded on an optical disc medium; and a servo implementation unit for controlling a relative position of the optical pickup with respect to a surface of the optical disc medium according to the output signal of the optical pickup to implement servo control for maintaining a state where the information is readable from the optical disc medium, the program controlling a computer to function as parameter adjustment means for changing a value of each of a plurality of parameters set for the servo control to a given target value when the servo control is implemented, wherein the parameter adjustment means performs the change of the value of at least one of the plurality of parameters to the target value a plurality of times, and changes another parameter between the plurality of times of changing the at least one parameter, and wherein the parameter adjustment means divides an amount of the change of the at least one of the plurality of parameters to the target value in predetermined step change amounts as units, and changes the value of the at least one of the plurality of parameters by each of the predetermined step change amounts each time.

* * * * *